United States Patent [19]

Tsubata et al.

[11] Patent Number: 5,662,828

[45] Date of Patent: Sep. 2, 1997

[54] COMPOUND HAVING UNSATURATED SIDE CHAIN, PROCESS FOR PREPARING THE SAME, LIQUID CRYSTALLINE POLYMER PREPARED FROM THE SAME, LIQUID CRYSTAL MIXTURE AND DISPLAY ELEMENT

[75] Inventors: Yoshiaki Tsubata; Kayoko Ueda; Koichi Fujisawa, all of Tsukuba; Takayuki Higashii, Yokohama; Masayoshi Minai, Moriyama; Naoyuki Takano; Yukari Fujimoto, both of Takatsuki, all of Japan

[73] Assignee: Sumitomo Chemical Company, Limited, Osaka, Japan

[21] Appl. No.: 471,018

[22] Filed: Jun. 6, 1995

Related U.S. Application Data

[62] Division of Ser. No. 274,315, Jul. 13, 1994, Pat. No. 5,554,317.

[30] Foreign Application Priority Data

| Jul. 13, 1993 | [JP] | Japan | 5-173337 |
| Aug. 3, 1993 | [JP] | Japan | 5-192380 |
| Oct. 7, 1993 | [JP] | Japan | 5-251683 |
| Feb. 3, 1994 | [JP] | Japan | 6-011895 |

[51] Int. Cl.$^6$ .............. C09K 19/34; C07D 239/02; C07D 241/02; C08F 120/00
[52] U.S. Cl. .............. 252/299.61; 252/299.01; 252/299.62; 544/238; 544/298; 544/336; 544/408; 546/133; 546/134; 546/137; 546/138; 546/141; 546/152; 546/153; 546/290; 546/339; 526/318.1; 526/318.2; 526/329.7
[58] Field of Search .............. 252/299.01, 299.61, 252/299.62; 544/238, 298, 336, 408; 546/133, 134, 137, 138, 141, 152, 153, 290, 339; 526/318.1, 318.2, 329.7

[56] References Cited

U.S. PATENT DOCUMENTS

| 4,913,839 | 4/1990 | Uchida et al. | 252/299.01 |
| 5,138,010 | 8/1992 | Keller et al. | 528/26 |
| 5,211,877 | 5/1993 | Andrejewski et al. | 252/299.01 |
| 5,252,251 | 10/1993 | Sato et al. | 252/299.01 |
| 5,332,520 | 7/1994 | Bach et al. | 252/299.01 |
| 5,332,521 | 7/1994 | Yuasa et al. | 252/299.01 |
| 5,332,522 | 7/1994 | Chen et al. | 252/299.01 |

FOREIGN PATENT DOCUMENTS

| 0376310 | 7/1990 | European Pat. Off. . |
| 0464728 | 1/1992 | European Pat. Off. . |
| 0512308 | 11/1992 | European Pat. Off. . |
| 3731638 | 4/1989 | Germany . |
| 4031405 | 2/1992 | Japan . |
| WO9000584 | 1/1990 | WIPO . |
| WO9000586 | 1/1990 | WIPO . |

*Primary Examiner*—Shean C. Wu
*Attorney, Agent, or Firm*—Birch, Stewart, Kolasch & Birch, LLP

[57] ABSTRACT

A compound having an unsaturated side chain represented by the formula:

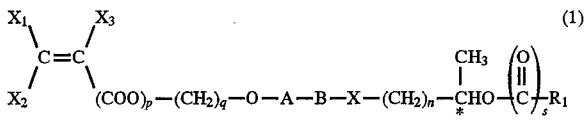

in which A and B are the same and different and represent an aromatic or heterocyclic group or either one of A and B represents a single bond; $X_1$, $X_2$ and $X_3$ are the same or different and represent a hydrogen atom or a lower alkyl group; $R_1$ represents a saturated or unsaturated alkyl group which may be substituted with a halogen atom or an alkoxyalkyl group which may be substituted with a halogen atom; X represents —$CH_2CH_2$—, —CH=CH—, —C≡C— or a single bond; n is an integer of 0 to 6; q is an integer of 1 to 15; p and s are each 0 or 1; and the asterisk * indicates an asymmetric carbon atom, which is useful as an intermediate of a liquid crystal or a monomer of a liquid crystalline polymer.

12 Claims, 8 Drawing Sheets

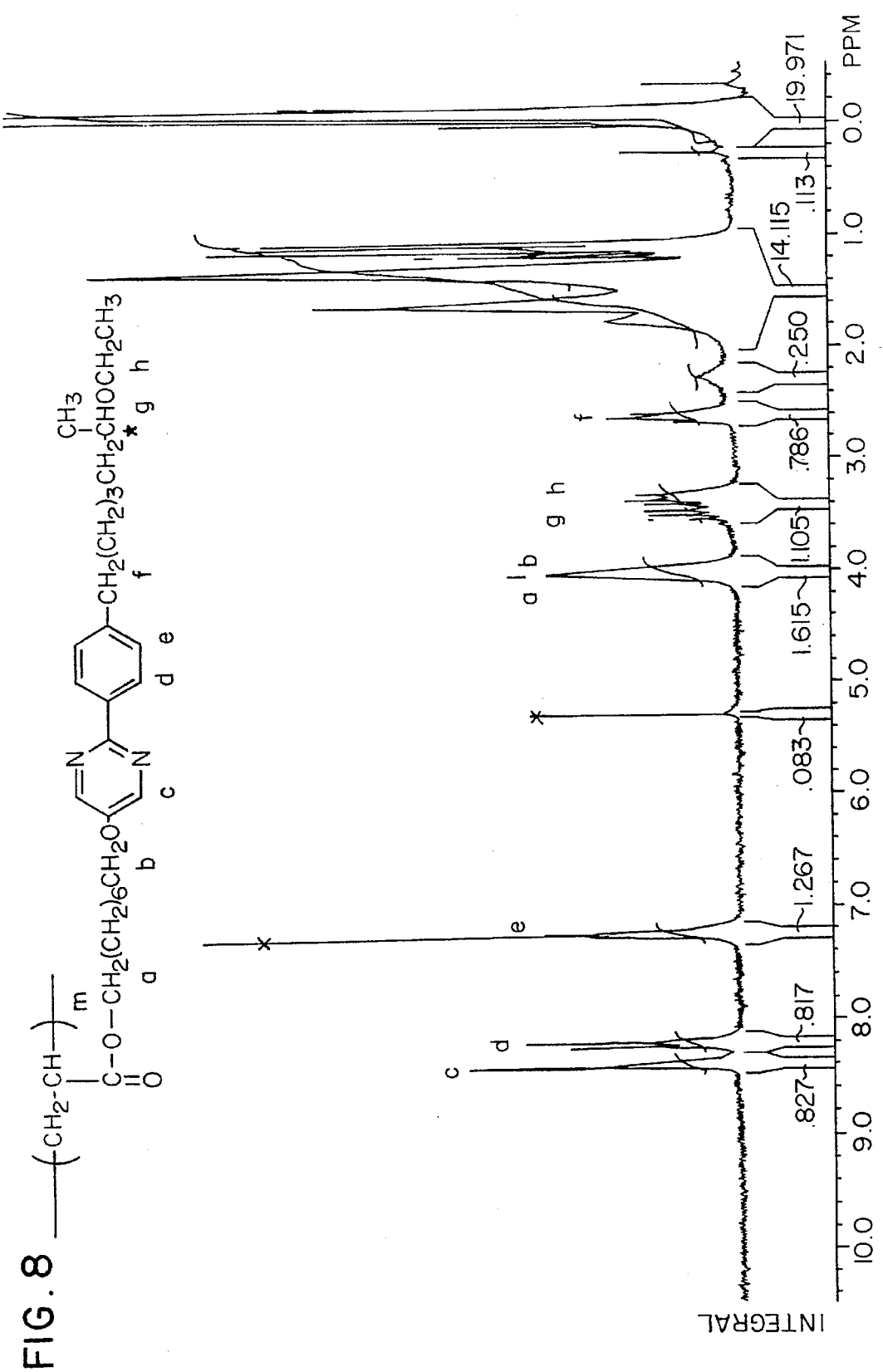

COMPOUND HAVING UNSATURATED SIDE CHAIN, PROCESS FOR PREPARING THE SAME, LIQUID CRYSTALLINE POLYMER PREPARED FROM THE SAME, LIQUID CRYSTAL MIXTURE AND DISPLAY ELEMENT

This application is a divisional of application Ser. No. 08/274,315, filed on Jul. 13, 1994, now U.S. Pat. No. 5,554,017, the entire contents of which are hereby incorporated by reference.

BACKGROUND OF THE INVENTION

1. Field of the Invention

The present invention relates to a compound having an unsaturated side chain, a process for preparing the same, a liquid crystalline polymer prepared from the same, a liquid crystal mixture and a display element.

2. Description of the Related Art

In these days, as a liquid crystal display, a twisted nematic (TN) liquid crystal display is most widely used. A TN liquid crystal display has various advantages that a low driving voltage, a low power demand, and the like. However, its response speed is slower than a light-emitting type display element such as a cathode ray tube display, an electroluminescence display, a plasma display, etc.

A super twisted nematic (STN) liquid crystal display having an increased twist angle from 180° C. to 270° C. has been developed, but its response speed is still insufficient.

Though various improvements have been made in the liquid crystal displays, no TN liquid crystal display having a high response speed has been developed.

In a new display using a ferroelectric liquid crystal which is recently vigorously studied, a response speed may be expected to be increased greatly (see Clark et al, Appl. Phys. Lett., 36, 899 (1980)). This type of display makes use of a chiral smectic phase such as a chiral smectic C phase (hereinafter referred to as a "Sc* phase") which has a ferroelectric property. As phases having the ferroelectric property, there are known chiral smectic F, G, H and I phases in addition to the Sc* phase.

The ferroelectric liquid crystal material which is actually used in a ferroelectric liquid crystal element is required to have various characteristics. But, at present, a single compound cannot satisfy all the characteristics, and it is necessary to formulate a ferroelectric liquid crystal mixture comprising plural liquid crystal compounds, or at least one liquid crystal compound and at least one non-liquid crystal compound.

In addition to the ferroelectric liquid crystal mixture consisting of the ferroelectric liquid crystal compounds, Japanese Patent KOKAI Publication No. 195187/1986 discloses the preparation of a ferroelectric liquid crystal mixture by mixing a compound having a nonchiral smectic C, F, G, H or I phase (hereinafter referred to as "Sc-like phase") or a mixture containing such compound with at least one compound having the ferroelectric phase to make the liquid crystal mixture ferroelectric as a whole.

Mol. Cryst. Liq. Cryst., 89, 327 (1982) provides a ferroelectric liquid crystal mixture comprising a compound or a mixture having the Sc-like phase and at least one compound which is optically active but has no ferroelectric phase.

From the above, it is understood that a ferroelectric liquid crystal mixture can be formulated from at least one optically active compound which may have the ferroelectric phase or not, as a base compound. Preferably, the optically active compound has a liquid crystal phase. When it has no liquid crystal phase, it is preferred that its structure is similar to a liquid crystal compound, namely it is a quasi-liquid crystal compound.

However, there has been found no liquid crystal substance which has spontaneous polarization required for the high speed response and a low viscosity and exhibits the ferroelectric phase in a wide temperature range including room temperature.

Further, no report has been made on the use of such liquid crystal substance as a monomer component of a polymer.

Comparing a display element using a low molecular weight liquid crystal which is widely used in an electronic calculator, a watch or a display and a display element using a liquid crystalline polymer, the former has the following drawbacks. That is, as a display using the low molecular weight liquid crystal, there is used a panel comprising a pair of glass plates a gap of which is controlled in the order of several micrometers and the low molecular weight liquid crystal is interposed between the glass plates. In this case, it is extremely difficult to control the gap between the glass plates in the order of several micrometers over a wide area, such display has poor impact resistance, and it is difficult to constantly supply the wide area displays due to the influence of gravity. On the other hand, since the liquid crystalline polymer is a macromolecule, it has a self-supporting property, so that it may overcome the drawbacks of the low molecular weight liquid crystal display (see J. Polym. Sci., Polym. Lett., Ed. 13, 243 (1975) and Polym. Bull., 6, 309 (1982)).

One of the drawbacks of the liquid crystalline polymer is a long response time against a change of an external factor such as an electric field, so that it cannot be used to display moving pictures.

SUMMARY OF THE INVENTION

An object of the present invention is to provide a novel compound which is useful as a component of a ferroelectric liquid crystal mixture and a precursor monomer of a ferroelectric liquid crystalline polymer.

Another object of the present invention is to provide a process for preparing the novel compound of the present invention.

A further object of the present invention is to provide a liquid crystalline polymer comprising the novel monomeric compound of the present invention.

A yet further object of the present invention is to provide a liquid crystal mixture comprising the liquid crystalline polymer of the present invention.

A still further object of the present invention is to provide a liquid crystal display element comprising the liquid crystalline polymer of the present invention.

According to a first aspect of the present invention, there is provided a compound having an unsaturated side chain represented by the formula:

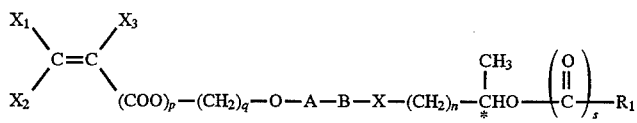

wherein A and B are the same and different and represent a group selected from the group consisting of 1,4-phenylene, 2,5-pyridine, 2,5-pyrimidine, 2,5-pyrazine, 3,6-pyridazine, 4,4'-biphenyl, 5-(2 -phenylpyrimidine), 2-(5-phenylpyrimidine), 2-(5-phenylpyridine), 2,6-naphthalene, 2,6-quinoline, 2,6-quinoxaline and 2,6-quinazoline, or either one of A and B represents a single bond, provided that the phenyl ring may be optionally substituted with at least one fluorine atom; $X_1$, $X_2$ and $X_3$ are the same or different and represent a hydrogen atom or a lower alkyl group having 1 to 5 carbon atoms; $R_1$ represents a saturated or unsaturated alkyl group having 1 to 20 carbon atoms which may be optionally substituted with at least one halogen atom or an alkoxyalkyl group having 2 to 20 carbon atoms which may be optionally substituted with at least one halogen atom; X represents —$CH_2CH_2$—, —CH=CH—, —C≡C— or a single bond; n is an integer of 0 to 6; q is an integer of 1 to 15; p and s are each 0 or 1; and the asterisk * indicates an asymmetric carbon atom.

According to a second aspect of the present invention, there is provided a polysiloxane liquid crystalline polymer comprising a homograft or cograft polymer obtained by graft polymerizing at least one compound selected from the group consisting of a compound of the formula:

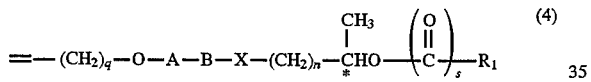

wherein A, B, X, $R_1$, n, q and s are the same as defined above, and a compound of the formula:

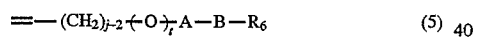

wherein A and B are the same as defined above; $R_6$ is an alkyl group having 3 to 20 carbon atoms, an alkoxy group having 3 to 20 carbon atoms, an alkoxyalkyl group having 3 to 20 carbon atoms or an alkoxyalkyloxy group having 3 to 20 carbon atoms; j is an integer of 3 to 17; and t is 0 or 1 on a polyalkylhydrosiloxane.

According to a third aspect of the present invention, there is provided a polysiloxane liquid crystalline polymer having a number average molecular weight of 1000 to 30,000 and comprising repeating units of the formulas:

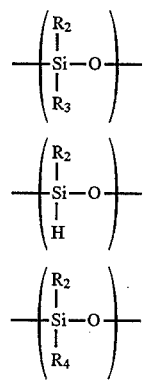

wherein $R_2$ and $R_3$ are the same or different and represent an alkyl group having 1 to 5 carbon atoms; $R_4$ represents a group of the formula:

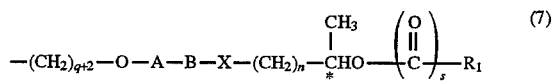

in which A, B, X, $R_1$, q, n and s are the same as defined above; and $R_5$ represents a group of the formula:

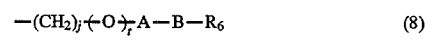

in which $R_6$, j and t are the same as defined above, and —A—B— represents a group of the formula:

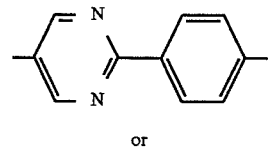

or

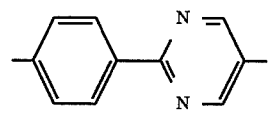

where molar ratios w, x, y and z of the repeating units (I), (II), (III) and (IV), respectively satisfy the equations: $0 \leq w \leq 0.95$, $0 \leq x \leq 0.4$, $0 \leq y \leq 1$ and $0 \leq z \leq 1$ provided that at least one of y and z is not 0.

According to a fourth aspect of the present invention, there is provided a liquid crystalline polymer having a number average molecular weight of 1000 to 50,000 and comprising a repeating unit of the formula:

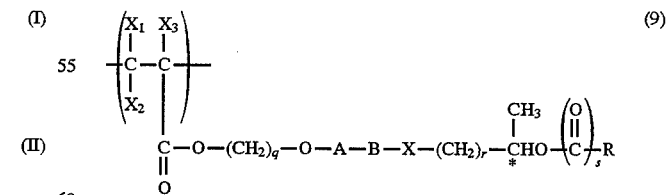

wherein A, B, X, $X_1$, $X_2$, $X_3$, $R_1$, q, n and s are the same as defined above.

According to a fifth aspect of the present invention, there is provided a polyacrylate liquid crystalline polymer having a number average molecular weight of 1000 to 50,000 and comprising a repeating unit of the formula:

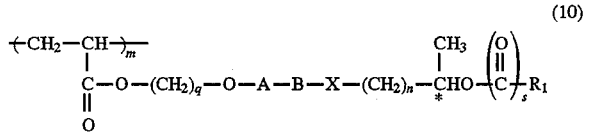

(10)

wherein A, B, X, $R_1$, q, n and s are the same as defined above, which is obtained by polymerizing a compound of the formula (1) wherein p is 1 (one) in the presence of a polymerization initiator.

According to a sixth aspect of the present invention, there is provided a ferroelectric liquid crystal mixture comprising at least one liquid crystalline polymer selected from the group consisting of the liquid crystalline polymers according to the second, third, fourth and fifth aspects of the present invention, and at least one other ferroelectric liquid crystal.

According to a seventh aspect of the present invention, there is provided a liquid crystal display element comprising the ferroelectric liquid crystal mixture according to the sixth aspect of the present invention.

DETAILED DESCRIPTION OF THE INVENTION

Figure 1:
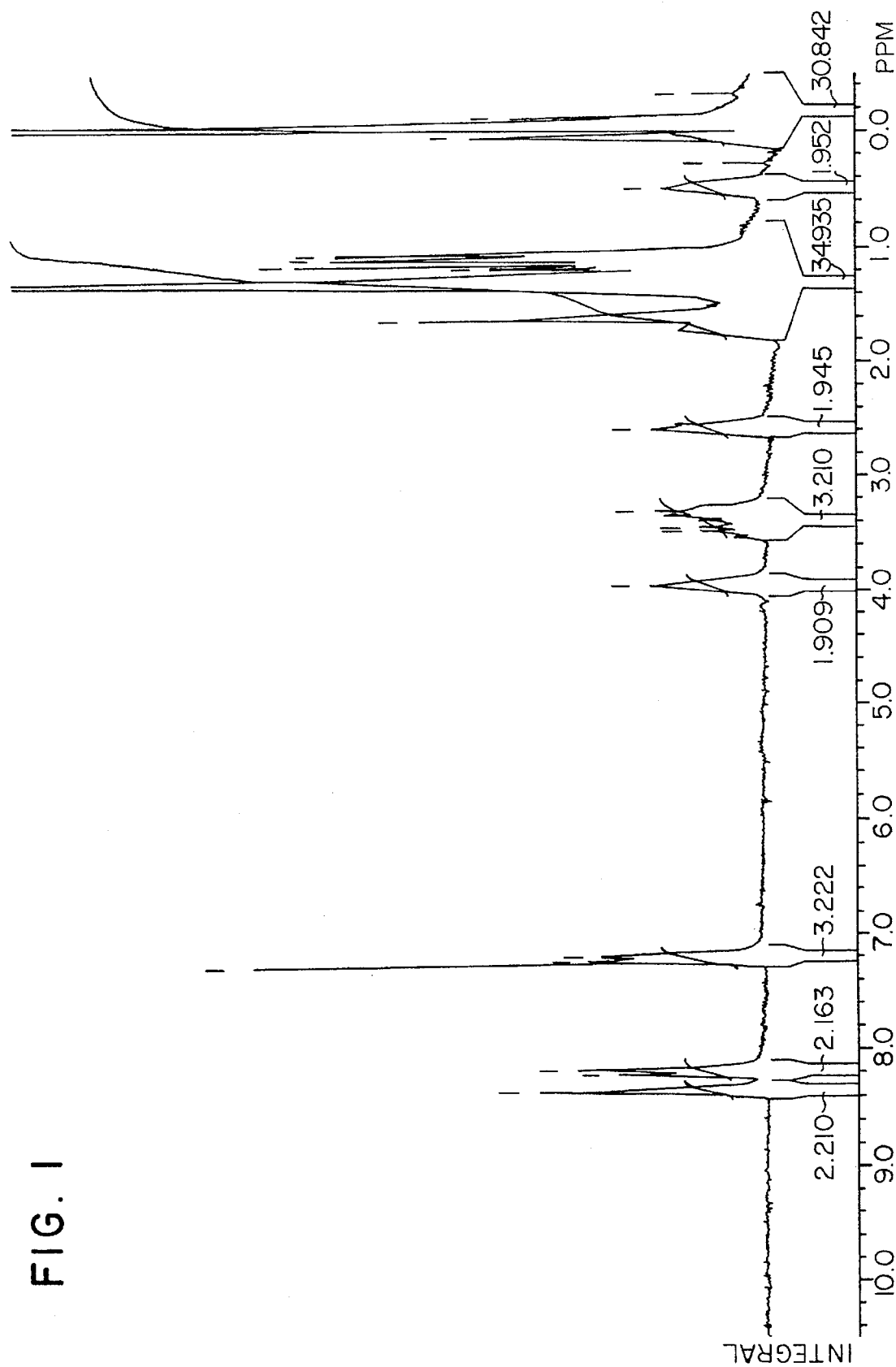

The compound of the formula (1) having the unsaturated side chain may be prepared by reacting a compound of the formula:

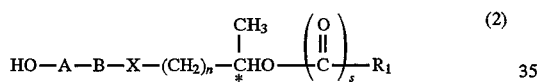

(2)

wherein A, B, X, $R_1$, n and s are the same as defined above, and an alkylating agent of the formula:

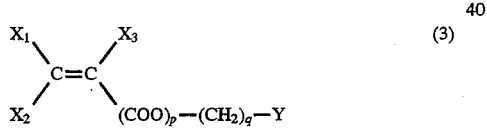

(3)

wherein $X_1$, $X_2$, $X_3$, p and q are the same as defined above, and Y is a halogen atom or a group of the formula: $OSO_2R_{10}$ in which $R_{10}$ is a lower alkyl group having 1 to 5 carbon atoms which may be optionally substituted with at least one halogen atom or a phenyl group which may be optionally substituted with at least one halogen atom, in the presence of a basic catalyst.

The compound of the formula (2) can be prepared by one of the following methods.

(i) When X is $-CH_2CH_2-$, $-CH=CH-$ or $-C\equiv C-$:

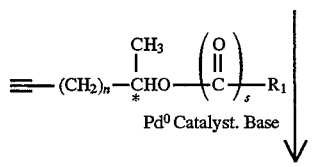

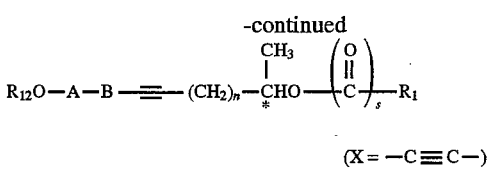

$(X = -C \equiv C-)$

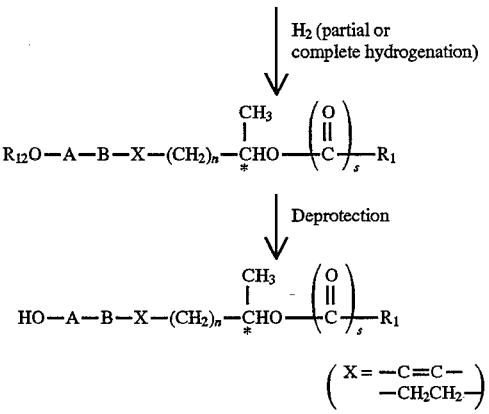

$\left( \begin{array}{c} X = -C=C- \\ -CH_2CH_2- \end{array} \right)$ wherein $R_{12}$ represents a hydrogen atom or a protecting group of a hydroxyl group, and Hal represents a halogen atom.

(ii) When X is a single bond:

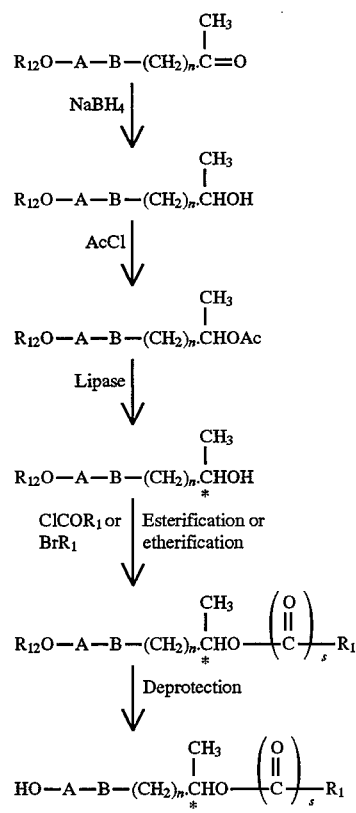

Most of the alkylating agents of the formula (3) which is the other raw material are the known compounds or can be prepared by the methods described in the literatures. For example, they may be prepared by halogenation of ω-hydroxy-1-alkene, or esterification of ω-halo-1-alkanol with acrylic acid.

An amount of the alkylating agent (3) is at least one equivalent, preferably from 1 to 5 equivalents to the hydroxy compound (2).

A kind of a solvent to be used in the reaction of the compound (2) and the alkylating agent (3) is not limited, and any solvent which is inactive to the reaction can used. Examples of the solvent are aliphatic or aromatic hydrocarbons, ethers, halogenated hydrocarbons, aprotic polar solvents and so on, such as tetrahydrofuran, ethyl ether, acetone, methyl ethyl ketone, toluene, benzene, chlorobenzene, dichloromethane, dichloroethane, chloroform, carbon tetrachloride, hexane, dimethylformamide, dimethylsulfoxide, hexamethylphospholylamide, N-methylpyrolidone, etc. They may be used independently or as a mixture thereof.

An amount of the solvent is not critical.

Examples of the base are alkali metal hydrides (e.g. sodium hydride, potassium hydride, etc.), alkali metals (e.g. lithium, sodium, potassium, etc.), alkali metal alcoholates (e.g. sodium ethylate, sodium methylate, etc.), alkali metal carbonates (e.g. sodium carbonate, potassium carbonate, etc.), butyl lithium, and the like.

The base should be used in an amount of at least one equivalent to the hydroxy compound. There is no upper limit of the amount of the base. Preferably, up to 5 times equivalent is used.

A reaction temperature is usually from −50° to 120° C., preferably from −30° to 100° C.

A reaction time is not limited. The reaction can be terminated when at least one of the raw materials is consumed.

After the completion of the reaction, the desired optically active compound of the formula (1) may be isolated from the reaction mixture by a conventional separation method such as extraction, phase separation, concentration, and so on. If necessary, the isolated compound may be purified by, for example, column chromatography, recrystallization, etc.

Specific examples of the alkylating agent which is used in the above reaction to prepare the compound (1) from the compound (2) are allyl chloride, allyl bromide, 1-halo-3-butene, 1-halo-4-pentene, 1-halo-5-hexene, 1-halo-6-heptene, 1-halo-7-octene, 1-halo-8-nonene, 1-halo-9-decene, 1-halo-10-undecene, 1-halo-11-dodecene, 1-halo-12-tridecene, 1-halo-13-tetradecene, 1-halo-14-pentadecene, 1-halo-15-hexadecene, 1-halo-16-heptadecene; 2-haloethyl acrylates, 3-halopropyl acrylates, 4-halobutyl acrylates, 5-halopentyl acrylates, 6-halohexyl acrylates, 7-haloheptyl acrylates, 8-halooctyl acrylates, 9-halononyl acrylates, 10-halodecyl acrylates, 11-haloundecyl acrylates, 12-halododecyl acrylates, 13-halotridecyl acrylates, 14-halotetradecyl acrylates, 15-halopenadecyl acrylates; and these compounds a halogen atom of which is substituted with a methanesulfonyloxy group, a trifluoromethanesulfonyloxy group, a p-toluenesulfonyl group, etc.

The substituents $X_1$, $X_2$ and $X_3$ in the acrylate may be selected from the group consisting of a hydrogen atom, a methyl group, an ethyl group and a propyl group.

Examples of the substituent $R_1$ in the formula (1) are methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, propenyl, 2-butenyl, 3-butenyl, 3-hexenyl, 2-butynyl, 3-hexynyl, cyclopropyl, 2,2-dimethylcyclopropyl, cyclopentyl, oyclohexyl, octadecyl, nonadecyl, eicosyl, methoxymethyl, methoxyethyl, methoxypropyl methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl; propoxyethyl, propoxypropyl, propoxybutyl, propoxypentyl, propoxyhexyl, propoxyheptyl, propoxyoctyl, propoxynonyl, propoxydecyl, butoxy, butoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyheptyl, pentyloxyoctyl, pentyloxynonyl, pentyloxydecyl, hexyloxymethyl; hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, heptyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl, 2-trihalomethylpropyl, 2-trihalomethylbutyl, 2-trihalomethylpentyl, 2-trihalomethylhexyl, 2-trihalomethylheptyl, 2-haloethyl, 2-halopropyl, 3-halopropyl, 3-halo-2-methylpropyl, 2,3-dihalopropyl, 2-halobutyl, 3-halobutyl, 4-halobutyl, 2,3-dihalobutyl, 2,4-dihalobutyl, 3,4-dihalobutyl, 2-halo-3-methylbutyl, 2-halo-3,3-dimethylbutyl, 2-halopentyl, 3-halopentyl, 4-halopentyl, 5-halopentyl, 2,4-dihalopentyl, 2,5-dihalopentyl, 2-halo-3-methylpentyl, 2-halo-4-methylpentyl, 2-halo-3-monohalomethyl-4-methylpentyl, 2-halohexyl, 3-halohexyl, 4-halohexyl, 5-halohexyl, 6-halohexyl, 2-haloheptyl, 2-halooctyl, and the like, wherein "halo" means fluoro, chloro or bromo. In addition, when s is 1 (one), the substituent $R_1$ may be halomethyl, 1-haloethyl, 1-halopropyl, 1-halobutyl, 1-halopentyl, 1-halohexyl, 1-haloheptyl, 1-halooctyl, and the like.

The alkyl or alkoxyalkyl group may be a straight, branched or cyclic group. When it is a branched or cyclic group, it may be an optically active group.

Now, the formula (1) is rewritten in the form of the formula (11), and specific examples of the group D will be exemplified:

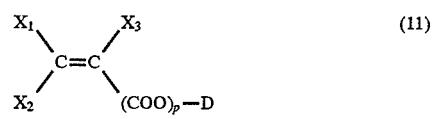

(11)

In the following formulas of the group D, q is the same as defined in the formula (1), and E represents the group of the formula:

$$-O-\left(\overset{\overset{O}{\|}}{C}\right)_s R_1 \quad (12)$$

in the formula (1). In the formula (12), s and $R_1$ are the same as defined in the formula (1) and exemplified above.

D =

[Structures of D groups, each terminating in –CHOCH₃ with a chiral center (*) and CH₃ substituent:]

$-(CH_2)_q-O-$[pyrimidine]$-$[phenyl]$-(CH_2)_2-\overset{CH_3}{\underset{*}{C}}HOCH_3$ $-(CH_2)_q-O-$[pyrimidine]$-$[phenyl]$-(CH_2)_2-\overset{CH_3}{\underset{*}{C}}HOCH_3$ $-(CH_2)_q-O-$[biphenyl]$-(CH_2)_2-\overset{CH_3}{\underset{*}{C}}HOCH_3$ $-(CH_2)_q-O-$[pyrimidine]$-$[phenyl]$-(CH_2)_3-\overset{CH_3}{\underset{*}{C}}HOCH_3$ $-(CH_2)_q-O-$[pyrimidine]$-$[phenyl]$-(CH_2)_3-\overset{CH_3}{\underset{*}{C}}HOCH_3$ $-(CH_2)_q-O-$[biphenyl]$-(CH_2)_3-\overset{CH_3}{\underset{*}{C}}HOCH_3$ $-(CH_2)_q-O-$[pyrimidine]$-$[phenyl]$-(CH_2)_4-\overset{CH_3}{\underset{*}{C}}HOCH_3$ $-(CH_2)_q-O-$[pyrimidine]$-$[phenyl]$-(CH_2)_4-\overset{CH_3}{\underset{*}{C}}HOCH_3$ $-(CH_2)_q-O-$[biphenyl]$-(CH_2)_4-\overset{CH_3}{\underset{*}{C}}HOCH_3$ $-(CH_2)_q-O-$[pyrimidine]$-$[phenyl]$-(CH_2)_5-\overset{CH_3}{\underset{*}{C}}HOCH_3$ $-(CH_2)_q-O-$[pyrimidine]$-$[phenyl]$-(CH_2)_5-\overset{CH_3}{\underset{*}{C}}HOCH_3$ $-(CH_2)_q-O-$[biphenyl]$-(CH_2)_5-\overset{CH_3}{\underset{*}{C}}HOCH_3$ -continued $-(CH_2)_q-O-$[pyrimidine]$-$[phenyl]$-(CH_2)_6-\overset{CH_3}{\underset{*}{C}}HOCH_3$ $-(CH_2)_q-O-$[pyrimidine]$-$[phenyl]$-(CH_2)_6-\overset{CH_3}{\underset{*}{C}}HOCH_3$ $-(CH_2)_q-O-$[biphenyl]$-(CH_2)_6-\overset{CH_3}{\underset{*}{C}}HOCH_3$ $-(CH_2)_q-O-$[phenyl]$-$[pyridine]$-(CH_2)_2-\overset{CH_3}{\underset{*}{C}}HOCH_3$ $-(CH_2)_q-O-$[phenyl]$-$[pyridine]$-(CH_2)_2-\overset{CH_3}{\underset{*}{C}}HOCH_3$ $-(CH_2)_q-O-$[phenyl]$-$[pyridine]$-(CH_2)_3-\overset{CH_3}{\underset{*}{C}}HOCH_3$ $-(CH_2)_q-O-$[phenyl]$-$[pyridine]$-(CH_2)_3-\overset{CH_3}{\underset{*}{C}}HOCH_3$ $-(CH_2)_q-O-$[phenyl]$-$[pyridine]$-(CH_2)_4-\overset{CH_3}{\underset{*}{C}}HOCH_3$ $-(CH_2)_q-O-$[phenyl]$-$[pyridine]$-(CH_2)_4-\overset{CH_3}{\underset{*}{C}}HOCH_3$ $-(CH_2)_q-O-$[phenyl]$-$[pyridine]$-(CH_2)_5-\overset{CH_3}{\underset{*}{C}}HOCH_3$ $-(CH_2)_q-O-$[phenyl]$-$[pyridine]$-(CH_2)_5-\overset{CH_3}{\underset{*}{C}}HOCH_3$ $-(CH_2)_q-O-$[phenyl]$-$[pyridine]$-(CH_2)_6-\overset{CH_3}{\underset{*}{C}}HOCH_3$ $-(CH_2)_q-O-$[phenyl]$-$[pyridine]$-(CH_2)_6-\overset{CH_3}{\underset{*}{C}}HOCH_3$ $-(CH_2)_q-O-$[pyrimidine]$-$[phenyl]$-(CH_2)_2-\overset{CH_3}{\underset{*}{C}}HOC_2H_5$

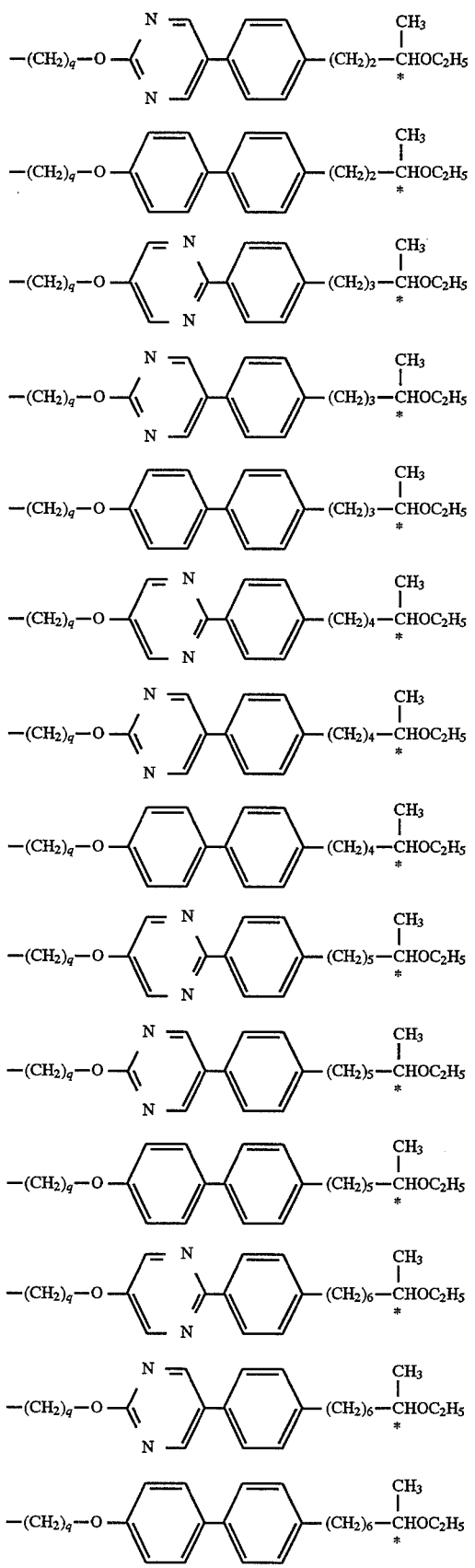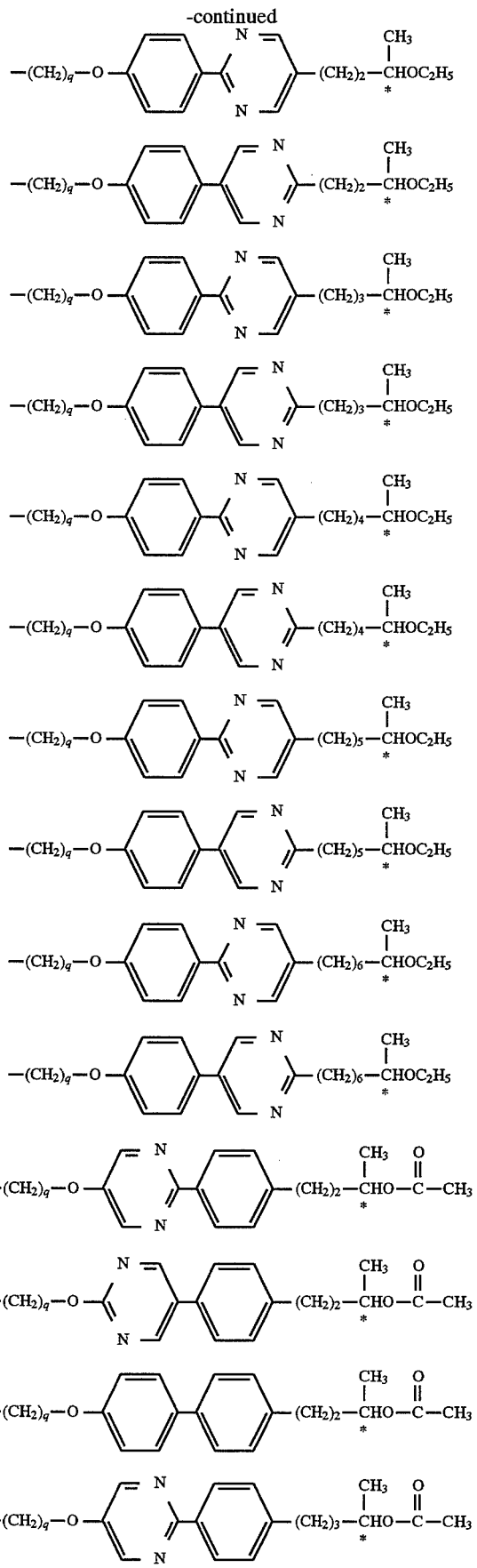

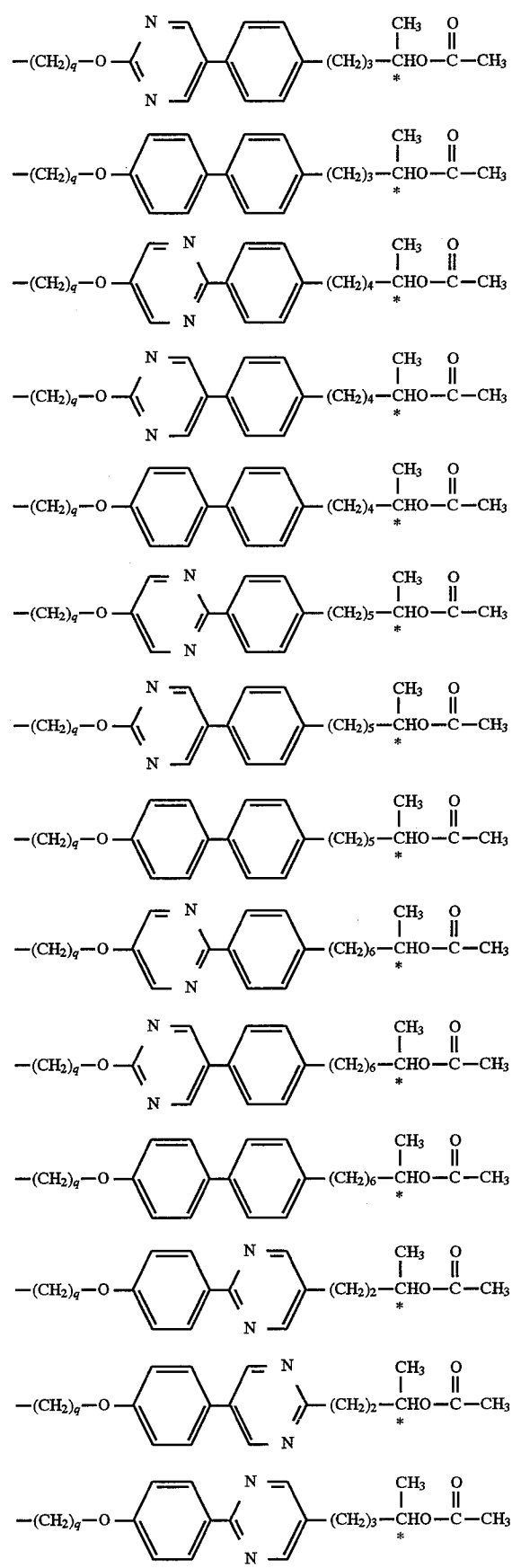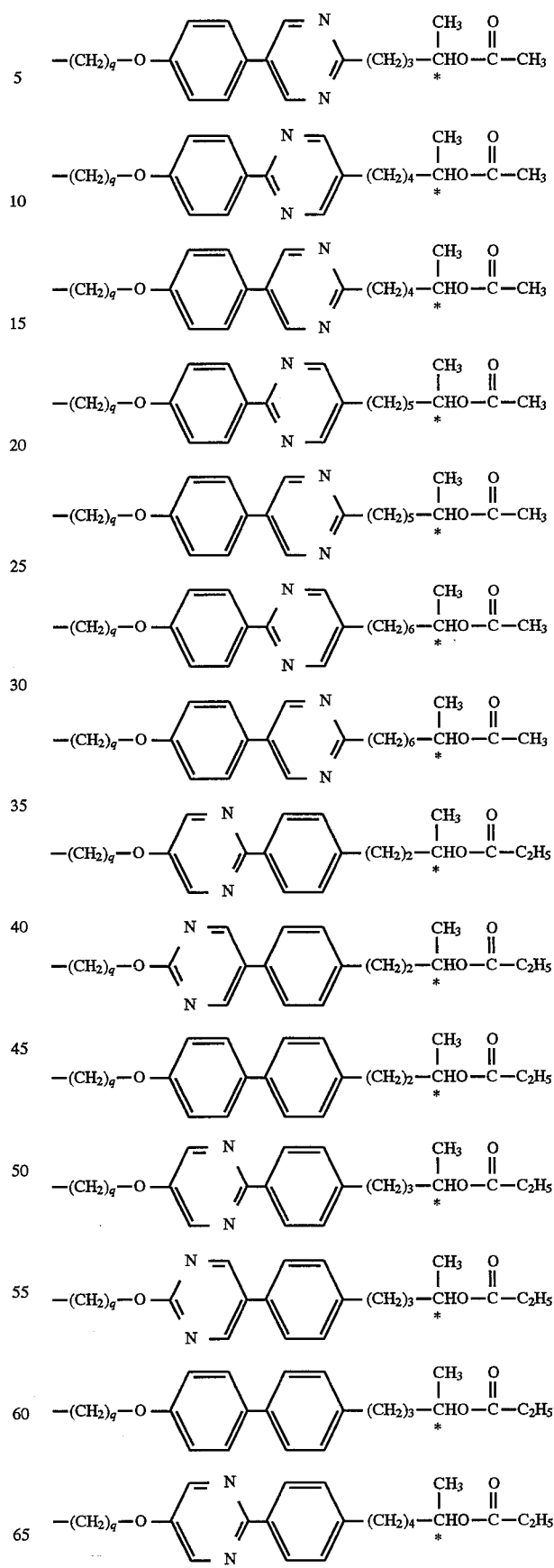

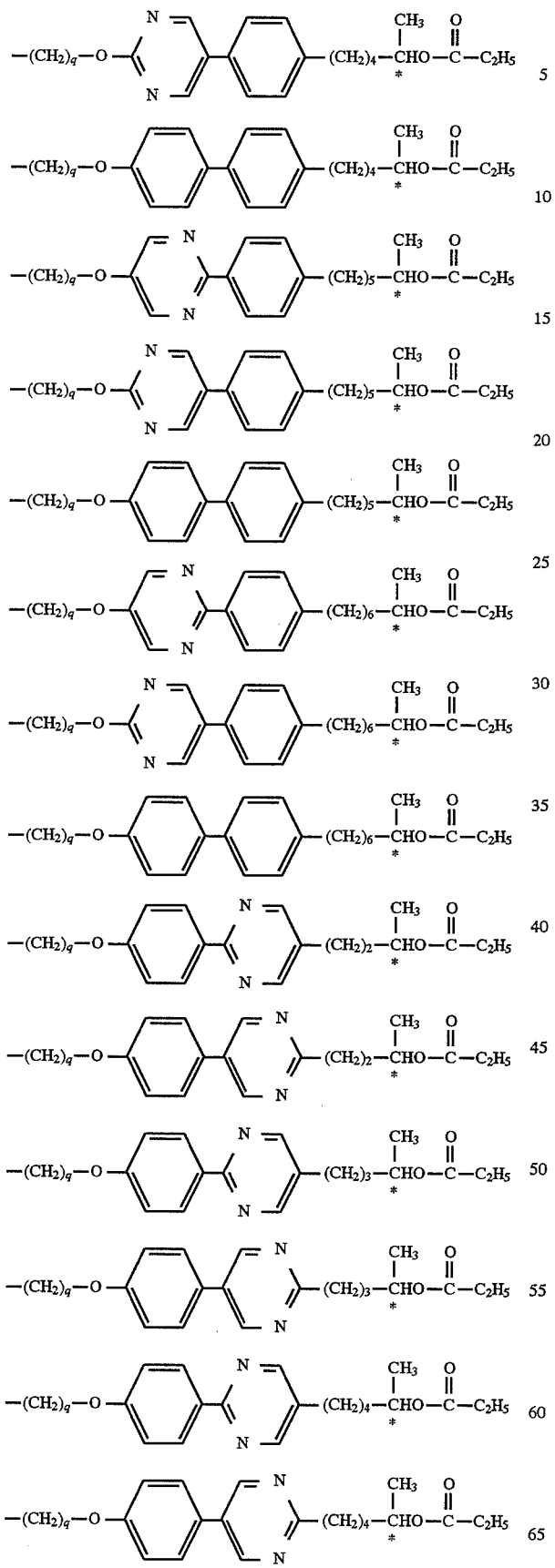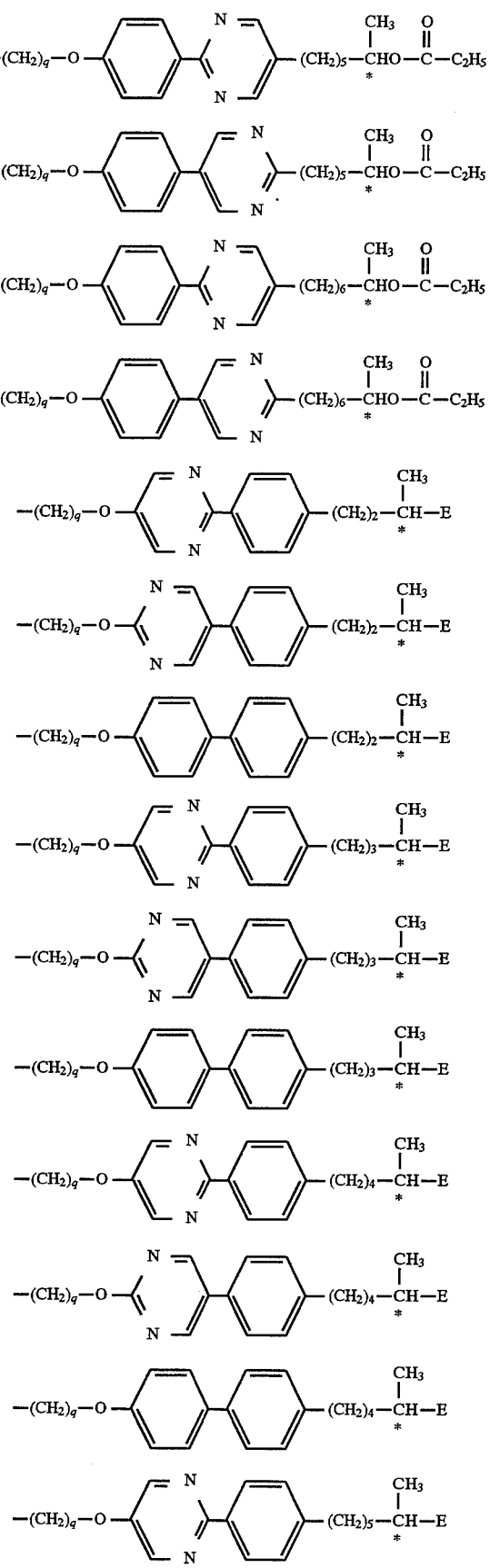

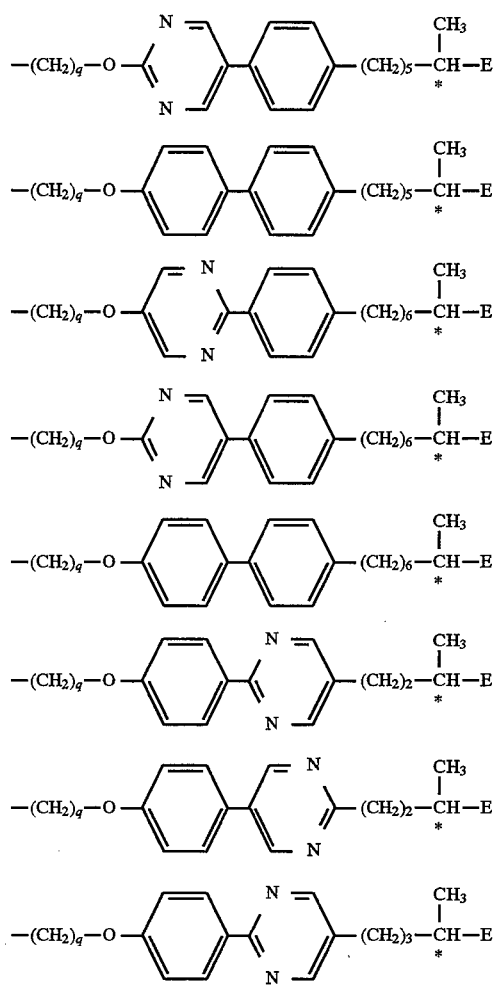
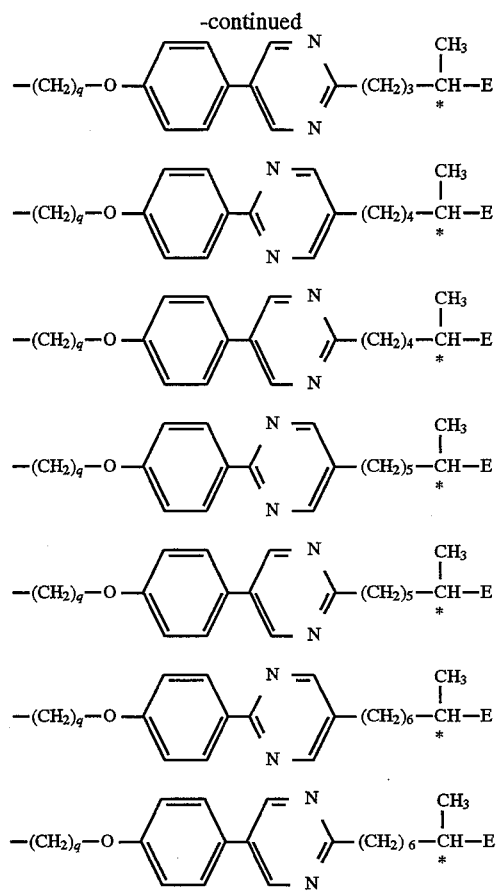
Examples of the structure of the group —A—B— in the formulas. (1) and (2) are as follows. In the following formulas, $X_4$, $X_5$ and $X_6$ represent independently a hydrogen atom or a fluorine atom.
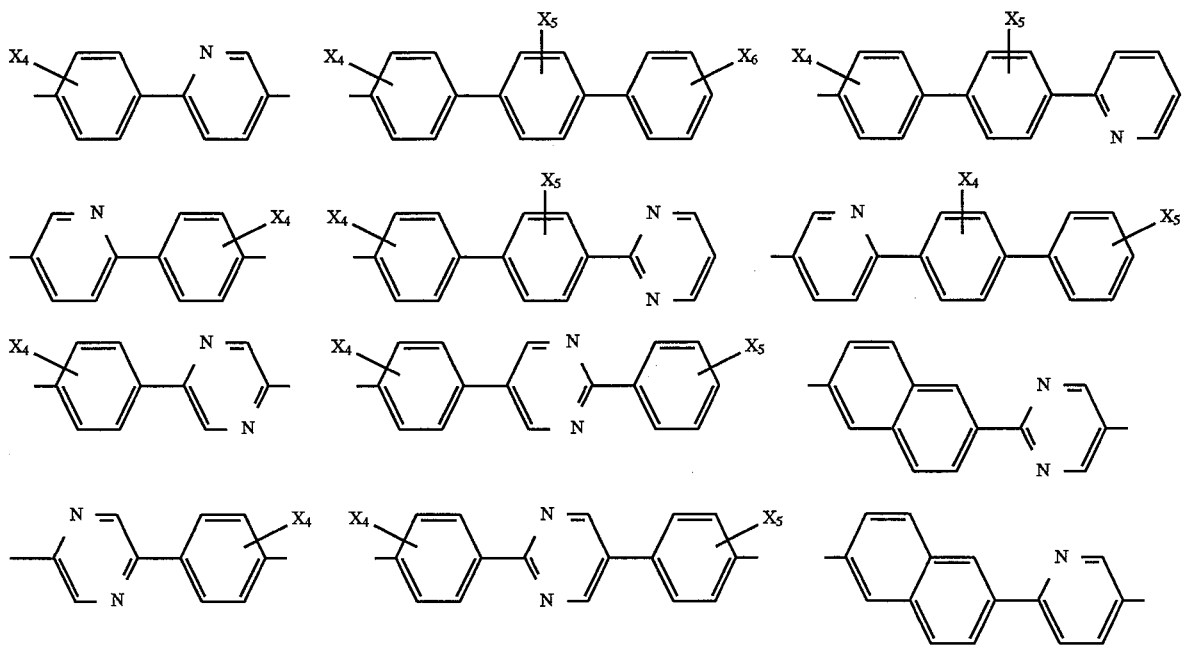

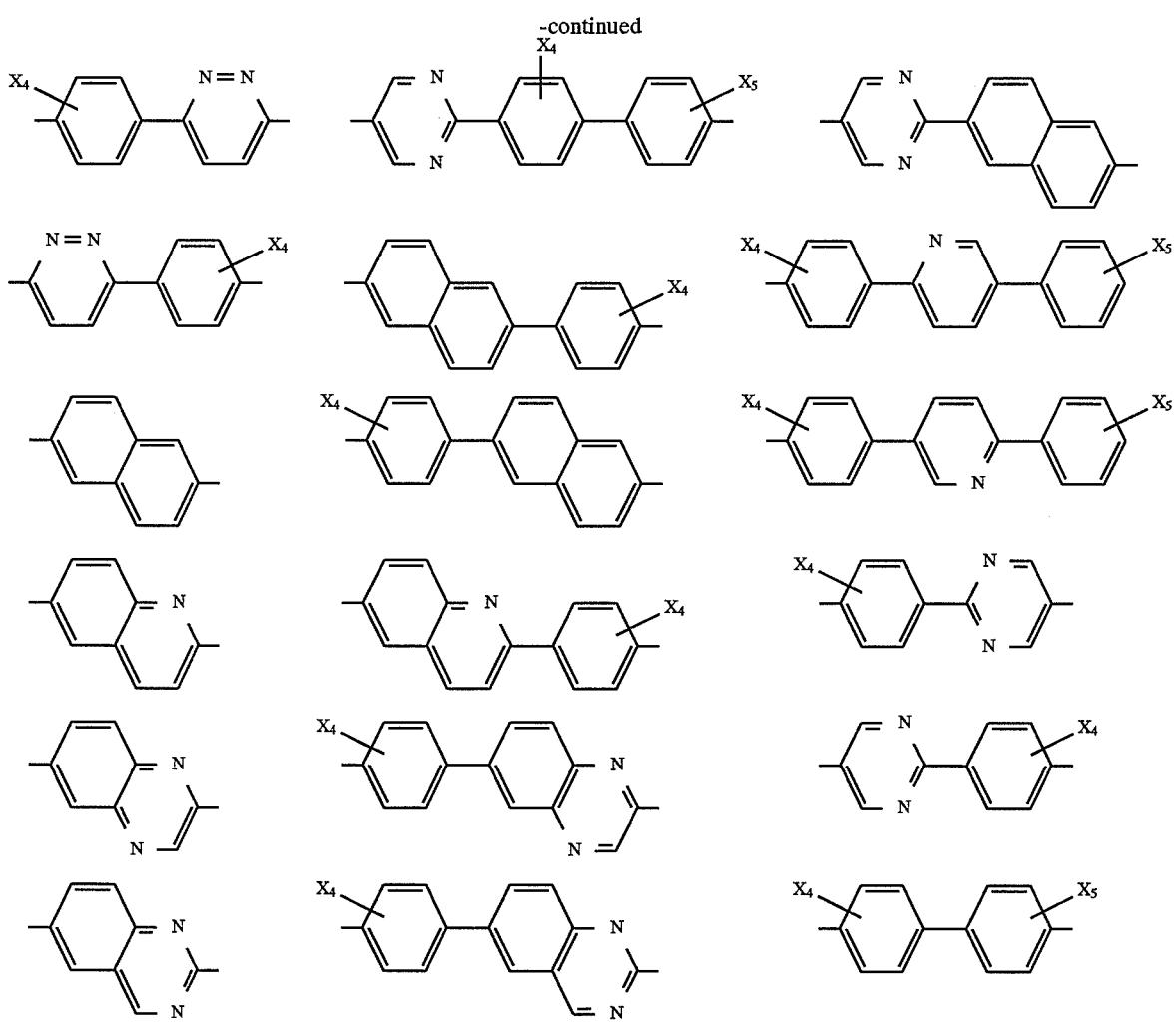

The polysiloxane liquid crystalline polymer of the present invention is a homo- or cograft polymer which is obtained by graft polymerizing at least one compound selected from the group consisting of a compound of the formula (4) and a compound of the formula (5) on a polyalkylhydrosiloxane:

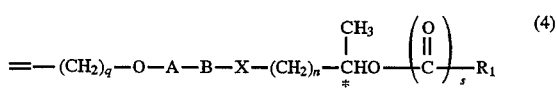

wherein A, B, X, R$_1$, n, q and s are the same as defined above

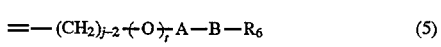

wherein A, B, R$_6$, j and t are the same as defined above.

For example, the polysiloxane liquid crystalline polymer of the present invention can be prepared by reacting at least one vinyl monomer selected from the group consisting of the compound (4) and the compound (5) with the polyalkylhydrosiloxane in toluene at a temperature of 50° to 100° C. for 7 to 30 hours in the presence of chloroplatinic acid as a catalyst.

Examples of the polyalkylhydrosiloxane are those comprising the repeating unit of the formula (11), or the repeating unit (I) and the repeating unit (II):

$$\left(\begin{array}{c} R_2 \\ | \\ Si-O \\ | \\ R_3 \end{array}\right) \quad (I)$$

$$\left(\begin{array}{c} R_2 \\ | \\ Si-O \\ | \\ H \end{array}\right) \quad (II)$$

wherein R$_2$ and R$_3$ are the same or different and each represent an alkyl group having 1 to 5 carbon atoms.

Examples of the alkyl group as the substituents R$_2$ and R$_3$ are methyl, ethyl and the like.

An example of the polysiloxane which is prepared by the above method is a polymer comprising the repeating units of the formulas:

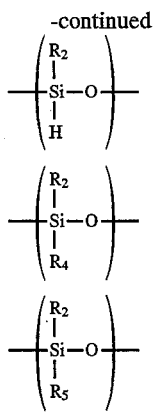

wherein $R_2$ and $R_3$ are the same as defined above, $R_4$ represents a group of the formula (6), and $R_5$ represents a group of the formula (7), where molar ratios w, x, y and z of the repeating units (I), (II), (III) and (IV), respectively satisfy the equations: $0 \leq w \leq 0.95$, $0 \leq x \leq 0.4$, $0 \leq y \leq 1$ and $0 \leq z \leq 1$ provided that at least one of y and z is not 0.

Specific examples of the substituents $R_2$ and $R_3$ are methyl, ethyl and the like.

The substituent $R_4$ represents the group of the formula:

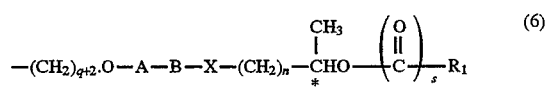

wherein A, B, X, $R_1$, q, n and s are the same as defined above. Specific examples of the substituent $R_4$ are the same as the group D of the formula (11).

The substituent $R_5$ represents the group of the formula:

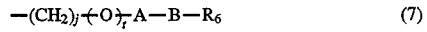

wherein A, B, j, t and $R_6$ are the same as defined above. Specific examples of the group of the formula (7) are

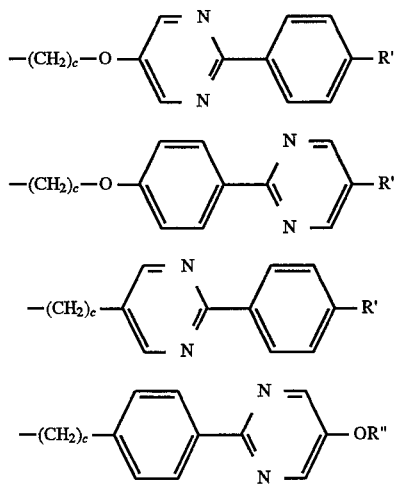

wherein c is an integer of 3 to 17, R' represents, for example, an alkyl group having 3 to 20, an alkoxyalkyl group having 3 to 20 carbon atoms or an alkoxyalkyloxy group having 3 to 20 carbon atoms, R" represents, for example, an alkyl group having 3 to 20 carbon atoms or an alkoxyalkyl group having 3 to 20 carbon atoms. The alkyl group in R' or R" may be a straight or branched alkyl group. In the case of the branched alkyl group, the alkyl group may have an asymmetric carbon atom.

An average degree of polymerization of the above polyalkylhydrosiloxane is from 3 to 500, preferably from 5 to 350. When the degree of polymerization is smaller than 3, the properties of the obtained liquid crystalline polymer as a polymer will be deteriorated. When the degree of polymerization is larger than 500, a viscosity of the obtained liquid crystalline polymer increases rapidly, so that a responsibility to an external stimulation will be deteriorated.

A molar ratio of the polyalkylhydrosiloxane in a copolymer is preferably from 0.05 to 1.0. When the molar ratio of the polyalkylhydrosiloxane is less than 0.05, the liquid crystalline properties of the polymer are deteriorated unpreferably.

The polysiloxane to be used in the present invention may be a straight one or a cyclic one.

Now, the liquid crystalline polymer comprising the repeating unit of the formula (9) and having the number average molecular weight of 1000 to 50,000 will be explained.

A preferred example of the liquid crystalline polymer comprising the repeating unit of the formula (9) and having the number average molecular weight of 1000 to 50,000 is a polyacrylate liquid crystalline polymer of the formula (10):

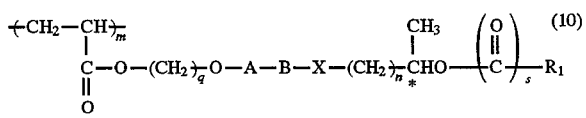

wherein A, B, X, $R_1$, q, n and s are the same as defined above.

The polyacrylate liquid crystalline polymer (10) may be prepared by polymerizing an acrylate monomer of the formula:

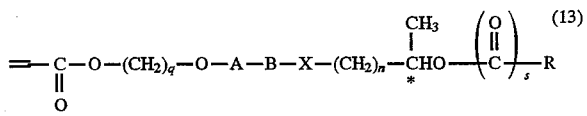

wherein A, B, X, $R_1$, q, n and s are the same as defined above under an inert gas atmosphere in a solvent such as tetrahydrofuran or N,N-dimethylformamide at a temperature of 20° to 60° C. for 8 to 120 hours in the presence of a radical polymerization initiator such as 2,2'-azobisisobutyronitrile (AIBN) or 2,2'-azobis(4-methoxy-2,4-dimethylvaleronitrile).

The liquid crystalline polymer having a desired molecular weight distribution can be obtained by suitable selection of the reaction conditions such as the reaction temperature, the solvent, the polymerization initiator, etc., or fractionation of the polymer by GPC column chromatography, or a combination thereof.

When the formula (10) is rewritten in the form of the following formula (14), an example of the substituent $R_{11}$ is the same as the —$(COO)_p$—D group of the formula (11) wherein p=1:

An average degree of polymerization of the above polyacrylate is from 3 to 500, preferably from 5 to 350. When the degree of polymerization is smaller than 3, the properties of the obtained liquid crystalline polymer as a polymer will be deteriorated. When the degree of polymerization is larger than 500, a viscosity of the obtained liquid crystalline polymer so much large, so that a responsibility to an external stimulation will be deteriorated.

An example of the ferroelectric liquid crystal mixture is a mixture comprising at least one of the liquid crystalline polymers according to the second, third, fourth and fifth aspects of the present invention, and at least one other ferroelectric liquid crystal.

Specific examples of the liquid crystalline polymer to be used are those of the formulas (I), (II), (III), (IV) and (10).

The other liquid crystal to be used in combination with the liquid crystalline polymer of the present invention is not limited. Examples of the liquid crystal are low molecular weight ferroelectric liquid crystals having the ferroelectric Sc* phase such as azomethine type compounds, Schiff's base compounds, azo or azoxy type compounds, biphenyl type compounds, aromatic ester type compounds, phenylpyrimidine type compounds, and the like.

Examples of the liquid crystal mixture having the ferroelectric Sc* phase are a liquid crystal mixture comprising at least one of the above ferroelectric compound and the other compound, and a liquid crystal mixture comprising a smectic liquid crystal as a base liquid crystal and a chiral agent is added to make the mixture to exhibit the ferroelectric Sc* phase, for instance, an azomethine type ferroelectric liquid crystal and a mixture comprising the same which are disclosed in Japanese Patent KOKAI Publication No. 260841/1987; a phenylprimidine type ferroelectric liquid crystal and a mixture comprising the same which are disclosed in Japanese Patent KOKAI Publication No. 12487/1991 corresponding to EP-A-352 480; a biphenyl type ferroelectric liquid crystal and a mixture comprising the same which are disclosed in Japanese Patent KOKAI Publication No. 83949/1991; Schiff's base ferroelectric liquid crystals and mixtures comprising the same which are disclosed in Japanese Patent KOKAI Publication No. 98051/1984 corresponding to U.S. Pat. No. 4,576,732 and Japanese Patent KOKAI Publication No. 199865/1985; an azoxy type ferroelectric liquid crystal and a mixture comprising the same which are disclosed in Japanese Patent KOKAI Publication No. 183256/1986 corresponding to U.S. Pat. No. 4,761,246; an aromatic ester type ferroelectric liquid crystal and a mixture comprising the same which are disclosed in Japanese Patent KOKAI Publication No. 167251/1990 corresponding to U.S. Pat. Nos. 5,124,070 and 5,264,151; a ferroelectric liquid crystal mixture comprising, as a base liquid crystal, a phenylpyrimidine type compound, a phenylpyridine type compound, a biphenyl type compound or an aromatic ester type compound which is a smectic liquid crystal, and a chiral agent which is disclosed in Japanese Patent KOKAI Publication No. 207790/1991; and a phenylpyrimidine type ferroelectric liquid crystal and a mixture comprising the same which are disclosed in Japanese Patent KOKAI Publication No. 178369/1992 corresponding to EP-A-435 632.

A typical example of such liquid crystal is a compound of the formula:

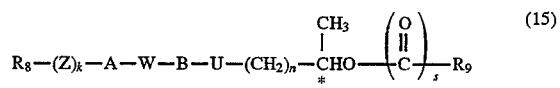

wherein A and B are the same as define above; $R_8$ represents an alkyl group having 3 to 20 carbon atoms; $R_9$ represents a saturated or unsaturated alkyl group having 1 to 20 carbon atoms which may be optionally substituted with at least one halogen atom or a saturated or unsaturated alkoxyalkyl group having 2 to 20 carbon atoms which may be optionally substituted with at least one halogen atom; U represents a group of the formula: —O—, —CH$_2$CH$_2$—, —CH=CH— or —C≡C— or a single bond; W represents a group of the formula: —COO— or —OCO— or a single bond, provided that when U is a group of the formula: —CH=CH— or —C≡C—, W is a single bond; Z is a group of the formula: —O—, —COO— or —OCO—; n is an integer of 0 to 6; s and k are each 0 (zero) or 1 (one); and the asterisk * indicates an asymmetric carbon atom.

The specific examples of the compound (15) are as follows. In the exemplified compounds, $R_8$, n, U, Z and k are the same as defined above. Examples of the substituent $R_{13}$ are a methyl group, an ethyl group, an acetyl group and a propanoyl group.

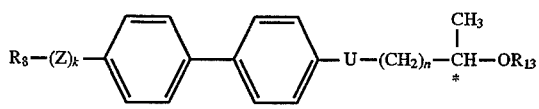

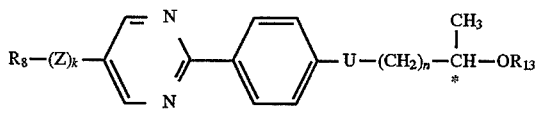

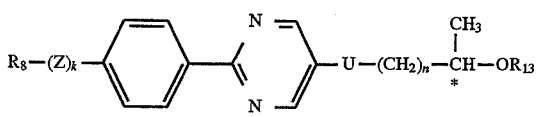

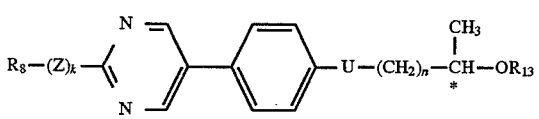

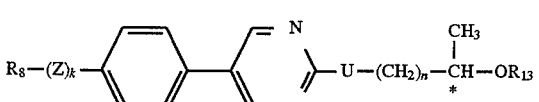

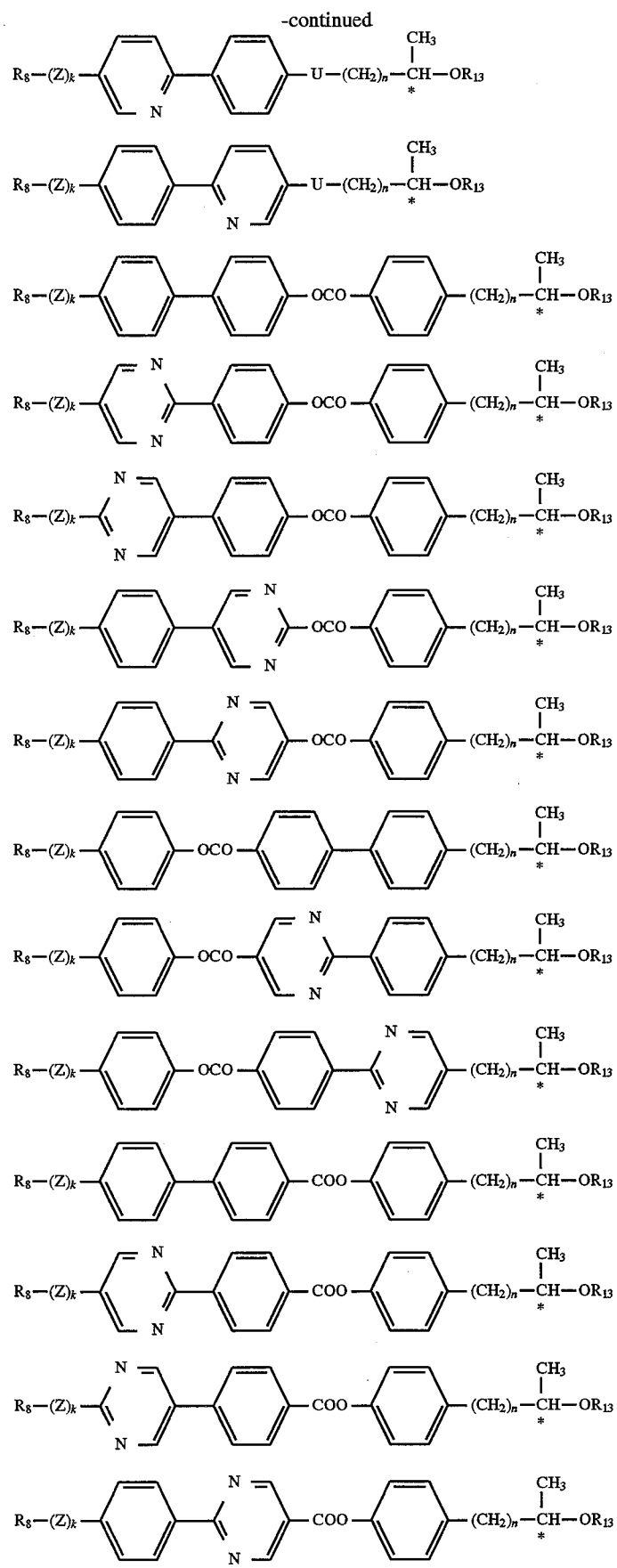

-continued

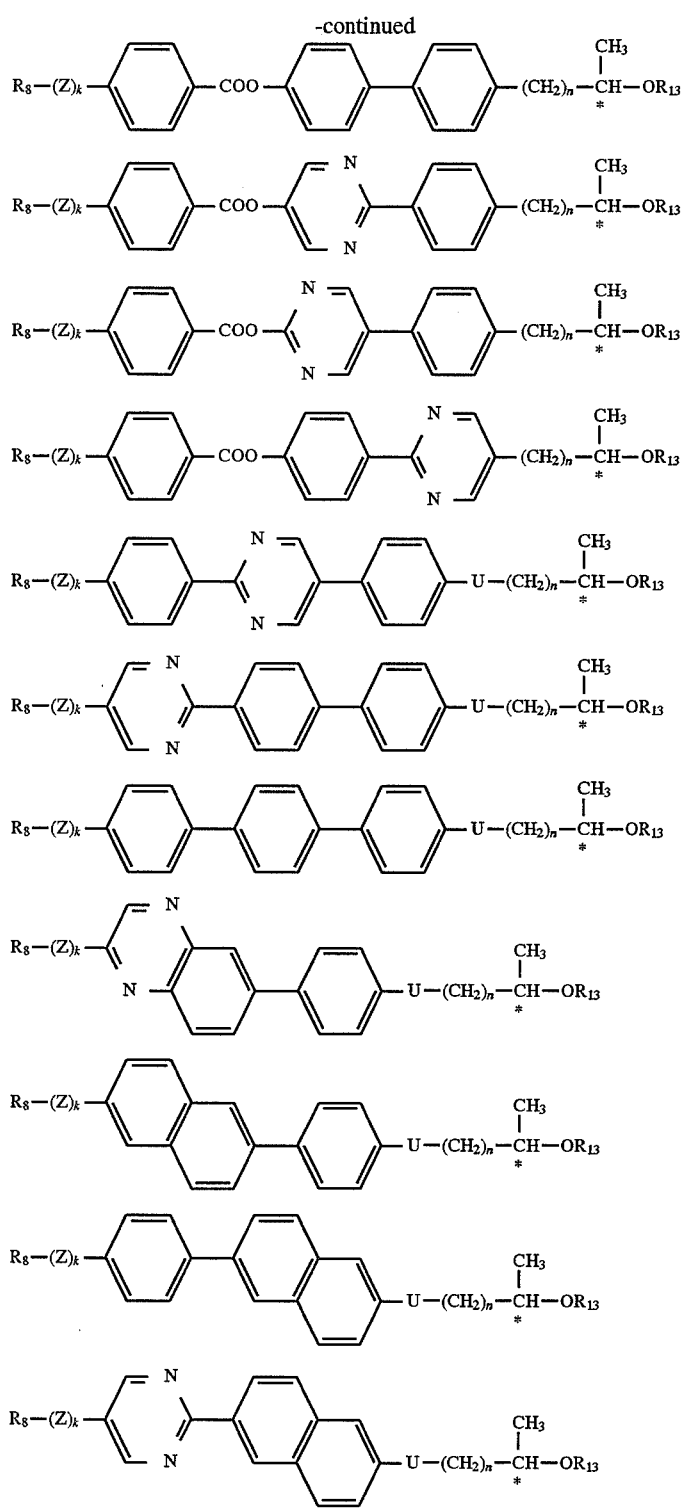

In the mixture of the present invention, an amount of the low molecular weight liquid crystal is usually from 5 to 90% by weight, preferably from 40 to 80% by weight. When the amount of the low molecular weight liquid crystal is less than 5% by weight, an improvement of orientation may not be sufficient. When the amount of the low molecular weight liquid crystal exceeds 90% by weight, the improvement of the impact resistance, which is one of the effects of the use of the liquid crystalline polymer, may be adversely affected.

EFFECTS OF THE INVENTION

The compound of the formula (1) according to the present invention is useful as an intermediate of a liquid crystal or as a monomer of a liquid crystalline polymer. In addition, the compound (1) may be used as an intermediate of an agrochemical or pharmaceutical. According to the present invention, this compound can be advantageously prepared in the industrial scale.

The liquid crystalline polymer and the ferroelectric liquid crystal mixture of the present invention are excellent in shock resistance and can be used as a component of the liquid crystal mixture which is used in a display element of a light weight large area display or a curved surface display.

Since the liquid crystalline polymer and the ferroelectric liquid crystal mixture of the present invention have the liquid crystal phase in a wide temperature range including room temperature and the typical properties of the polymer, for example, excellent impact resistance, they can be used advantageously in an electronic optical device such as a liquid crystal display, an optical shutter, an optical modulator, an optical waveguide, and the like. They will find various applications in the display material field and also in the information memory material filed.

The liquid crystalline polymer of the present invention has the liquid crystalline properties in a wide temperature range including room temperature. In particular, the polyacrylate liquid crystalline polymer of the formula (10) is useful in the above electronic optical device or as the information memory material, since it has a high response speed as the liquid crystalline polymer.

Further, the ferroelectric liquid crystal mixture comprising the liquid crystalline polymer of the present invention has a good orientation. In particular, when the polysiloxane liquid crystalline polymer is used, a contrast ratio is improved, while when the polyacrylate liquid crystalline polymer is used, a memory ratio is increased. Then, they are useful as a component of the display element.

PREFERRED EMBODIMENTS OF THE INVENTION

The present invention will be illustrated by the following Examples, which do not limit the scope of the present invention in any way.

In the following Examples, measurement of a phase transition temperature and identification of a liquid crystal phase are made using DSC and a polarizing microscope, respectively. A molecular weight of a polymeric compound is measured by the GPC method (polystyrene conversion). In the following phase sequences, K represents a crystal, g represents a glass state, Sx represents an unidentified smectic phase, Sc* represents a chiral smectic C phase, SA represents a smectic A phase and I represents an isotropic phase.

A response speed, a contrast ratio and a memory ratio are measured using a test cell made of a pair of ITO film-deposited glass plates on which an orientation film has been coated.

The response speed is measured by inserting the above cell between crossed polarizers, and a response time of a change of transmitted light amount from 10% to 90% is used as a response speed when a rectangular wave of ±10 V/μm is applied and the transmitted light amount in a bright state is 100% while that in a dark state is 0%.

The contrast ratio is expressed as a ratio of the transmitted light amount (absolute value) in the bright state to that in the dark state, which are measured under the same condition as in the measurement of the response speed.

The memory ratio of the material is measured by the single pulse method, and expressed as a ratio of a difference between the transmitted light amount in the bright state and that in the dark state under the application of pulse voltage of ±10 V/μm to a difference between the transmitted light amount in the bright state and that in the dark state in the memory state induced by the pulse.

EXAMPLE 1

In N,N-dimethylformamide (50 ml) contained in a four necked flask equipped with a stirrer and a thermometer, (−)-5-hydroxy-2-[4-(6-ethoxy-1-heptyl)phenyl]pyrimidine (3.14 g, 10 mmol), 1-bromo-7-octene (2.1 g, 11 mmol) and anhydrous potassium carbonate (4.15 mg) were charged and reacted under the nitrogen atmosphere at 50° to 55° C. for 3 hours. After the completion of the reaction, the reaction mixture was poured in water (200 ml) and extracted with toluene (200 ml). The obtained toluene solution was washed with 3% hydrochloric acid and water successively and concentrated under reduced pressure to obtain a yellow residue.

The residue was purified on silica gel column chromatography (an eluent: toluene-ethyl acetate) to obtain optically active (−)-5-(7-octenyloxy)-2-[4-(6-ethoxy-1-heptyl)phenyl]pyrimidine (4.0 g). Yield: 95%.

Specific rotatory power: −4.4° (c=1, chloroform)

The obtained compound had a liquid crystalline property.

Phase sequences: Sx(−3° C.)Sc*(36° C.)AS(46° C.)I

EXAMPLE 2

In N,N-dimethylformamide (50 ml) contained in a four necked flask equipped with a stirrer and a thermometer, (−)-5-hydroxy-2-[4-(6-ethoxy-1-heptyl)phenyl]pyrimidine (3.14 g, 10 mmol), 9-decenyl p-toluenesulfonate (3.4 g, 11 mmol) and anhydrous potassium carbonate (4.15 mg) were charged and reacted under the nitrogen atmosphere at 50° to 55° C. for 3 hours. After the completion of the reaction, the reaction mixture was poured in water (200 ml) and extracted with toluene (200 ml). The obtained toluene solution was washed with 3% hydrochloric acid and water successively and concentrated under reduced pressure to obtain a yellow residue.

The residue was purified on silica gel column chromatography (an eluent: toluene-ethyl acetate) to obtain optically active (−)-5-(9-decenyloxy)-2-[4-(6-ethoxy-1-heptyl)phenyl]pyrimidine (4.2 g). Yield: 93%.

Specific rotatory power: −4.2° (c=1, chloroform)

EXAMPLE 3

In N,N-dimethylformamide (50 ml) contained in a four necked flask equipped with a stirrer and a thermometer, (−)-5-hydroxy-2-[4-(6-ethoxy-1-heptyl)phenyl]pyrimidine (3.14 g, 10 mmol), 8-bromooctyl-1-acrylate (3.5 g, 15 mmol) and anhydrous potassium carbonate (4.15 mg) were charged and reacted under the nitrogen atmosphere at 40° to 45° C. for 5 hours. After the completion of the reaction, the reaction mixture was poured in water (200 ml) and extracted with toluene (200 ml). The obtained toluene solution was washed with 3% hydrochloric acid and water successively and concentrated under reduced pressure to obtain a yellow residue.

The residue was purified on silica gel column chromatography (an eluent: toluene-ethyl acetate) to obtain optically active (−)-5-(8-acryloyloxy-1-octyl)-2-[4-(6-ethoxy-1-heptyl)phenyl]-pyrimidine (3.3 g). Yield: 70%.

Specific rotatory power: −4.0° (c=1, chloroform)

The obtained compound had a liquid crystalline property.

Phase sequences:

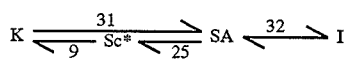

EXAMPLE 4

In N,N-dimethylformamide (50 ml) contained in a four necked flask equipped with a stirrer and a thermometer, (+)-5-hydroxy-2-[4-(6-propanoyloxy-1-heptyl)phenyl] pyrimidine (3.4 g, 10 mmol), 1-bromo-7-octene (2.1 g, 11 mmol) and anhydrous potassium carbonate (4.15 mg) were charged and reacted under the nitrogen atmosphere at 50° to 55° C. for 3 hours. After the completion of the reaction, the reaction mixture was poured in water (200 ml) and extracted with toluene (200 ml). The obtained toluene solution was washed with 3% hydrochloric acid and water successively and concentrated under reduced pressure to obtain a yellow residue.

The residue was purified on silica gel column chromatography (an eluent: toluene-ethyl acetate) to obtain optically active (+)-5-(7-octenyloxy)-2-[4-(6-propanoyloxy-1-heptyl)phenyl]-pyrimidine (4.2 g). Yield: 94%.

Specific rotatory power: +2.7° (c=1, chloroform)

EXAMPLE 5

In N,N-dimethylformamide (50 ml) contained in a four necked flask equipped with a stirrer and a thermometer, (+)-5-hydroxy-2-[4-(6-propanoyloxy-1-heptyl)phenyl] pyrimidine (3.4 g, 10 mmol), 9-decenyl p-toluenesulfonate (3.4 g, 11 mmol) and anhydrous potassium carbonate (4.15 mg) were charged and reacted under the nitrogen atmosphere at 50° to 55° C. for 3 hours. After the completion of the reaction, the reaction mixture was poured in water (200 ml) and extracted with toluene (200 ml). The obtained toluene solution was washed with 3% hydrochloric acid and water successively and concentrated under reduced pressure to obtain a yellow residue.

The residue was purified on silica gel column chromatography (an eluent: toluene-ethyl acetate) to obtain optically active (−)-5-(9-decenyloxy)-2-[4-(6-propanoyloxy-1-heptyl)phenyl]-pyrimidine (4.3 g). Yield: 90%.

Specific rotatory power: +3.2° (c=1, chloroform)

EXAMPLE 6

In N,N-dimethylformamide (50 ml) contained in a four necked flask equipped with a stirrer and a thermometer, (+)-5-hydroxy-2-[4-(6-propanoyloxy-1-heptyl)phenyl] pyrimidine (3.4 g, 10 mmol), 8-bromooctyl-1-acrylate (3.5 g, 15 mmol) and anhydrous potassium carbonate (4.15 mg) were charged and reacted under the nitrogen atmosphere at 40° to 45° C. for 5 hours. After the completion of the reaction, the reaction mixture was poured in water (200 ml) and extracted with toluene (200 ml). The obtained toluene solution was washed with 3% hydrochloric acid and water successively and concentrated under reduced pressure to obtain a yellow residue.

The residue was purified on silica gel column chromatography (an eluent: toluene-ethyl acetate) to obtain optically active (+)-5-(8-acryloyloxy-1-octyl)-2-[4-(6-propanoyloxy-1-heptyl)phenyl]pyrimidine (3.0 g). Yield: 60%.

Specific rotatory power: +2.5° (c=1, chloroform)

EXAMPLES 7–38

In the same manner as in each of Examples 1–6 except that a starting compound shown in Table 1 was used, the reaction and post-treatment were carried out to obtain a compound (1) shown in Tables 1–4.

EXAMPLE 39

The vinyl monomer (15) of the formula:

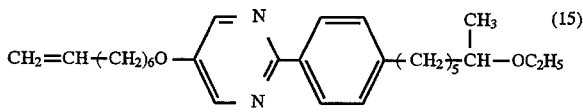

(580 mg) and polymethylhydrosiloxane (75 mg) (manufactured by Aldrich) were dissolved in toluene (10 ml). After stirring the solution under the nitrogen atmosphere at room temperature for about 40 minutes, as a catalyst, a 0.5% solution of chloroplatinic acid hexahydrate in isopropanol (0.15 ml) was added to the solution, and the reaction was effected in the nitrogen stream at about 75° C. for 8 hours. After the completion of the reaction, the reaction mixture was added in isopropanol to precipitate it and sedimented by a centrifugal separator, followed by removal of the supernatant by decantation. The obtained residue was dissolved in methylene chloride and again added in isopropanol to precipitate it. After sedimentation of the product by the centrifugal separator, the supernatant was removed by decantation, and the residue was dried under reduced pressure to obtain the polysiloxane having the following chemical structure (about 190 mg). Number average molecular weight: $2.3 \times 10^4$.

The $^1$H-NMR chart of the obtained polymer is shown in FIG. 1.

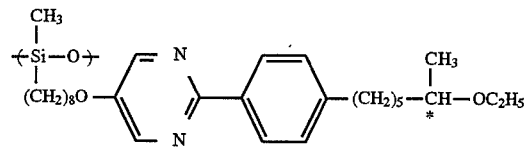

The phase sequences of the obtained polysiloxane was as follows:

g(−23° C.)Sx(−16° C.)Sc*(48° C.)I

EXAMPLE 40

The same vinyl monomer (15) as used in Example 39 (171 mg), the vinyl monomer (16) of the formula:

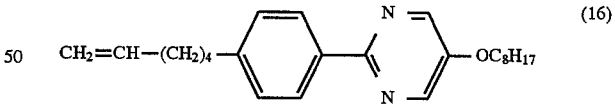

(443 mg) and polymethylhydrosiloxane (88 mg) (manufactured by Aldrich) were dissolved in toluene (10 ml). After stirring the solution under the nitrogen atmosphere at room temperature for about 40 minutes, as a catalyst, a 0.5% solution of chloroplatinic acid hexahydrate in isopropanol (0.15 ml) was added to the solution, and the reaction was effected under the nitrogen atmosphere at about 75° C. for 7.5 hours. After the completion of the reaction, the reaction mixture was in isopropanol to precipitate it and sedimentated by a centrifugal separator, followed by removal of the supernatant by decantation to obtain the polysiloxane having the following chemical structure. Number average molecular weight: $1.8 \times 10^4$.

Figure 2:
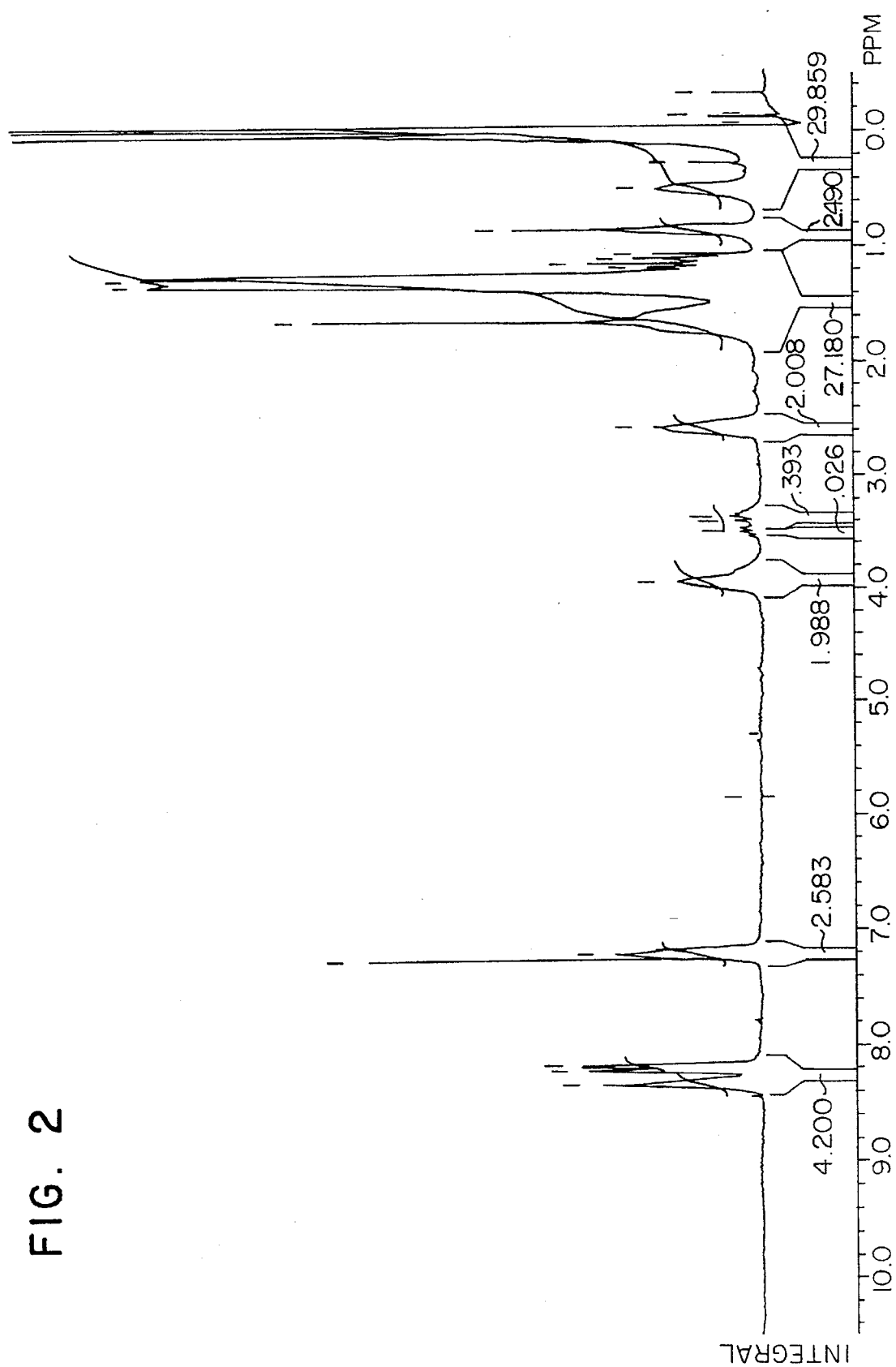

The $^1$H-NMR chart of the obtained polymer is shown in FIG. 2.

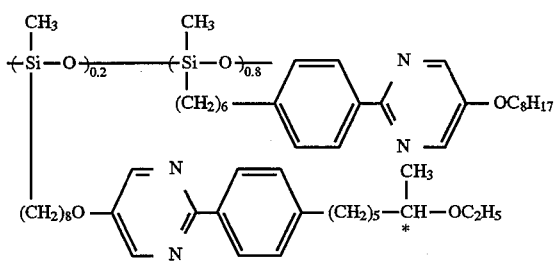

The phase sequences of the obtained polysiloxane was as follows:
g(−5° C.)Sx(69° C.)SC*(74° C.)SA(135° C.)I

EXAMPLE 41

The same vinyl monomers (15) and (16) as used in Example 40 (190 mg and 55 mg, respectively) and polymethylhydrosiloxane (34 mg) (manufactured by Aldrich) were dissolved in toluene (5 ml). After stirring the solution under the nitrogen atmosphere at room temperature for about 50 minutes, as a catalyst, a 0.4% solution of chloroplatinic acid hexahydrate in isopropanol (0.14 ml) was added to the solution, and the reaction was effected in the nitrogen stream at about 80° C. for 10 hours. After the completion of the reaction, the reaction mixture was added to precipitate it and sedimentated by a centrifugal separator, followed by removal of the supernatant by decantation. The obtained residue was dried under reduced pressure to obtain the polysiloxane having the following chemical structure (about 130 mg). Number average molecular weight: $2.1 \times 10^4$.

Figure 3:
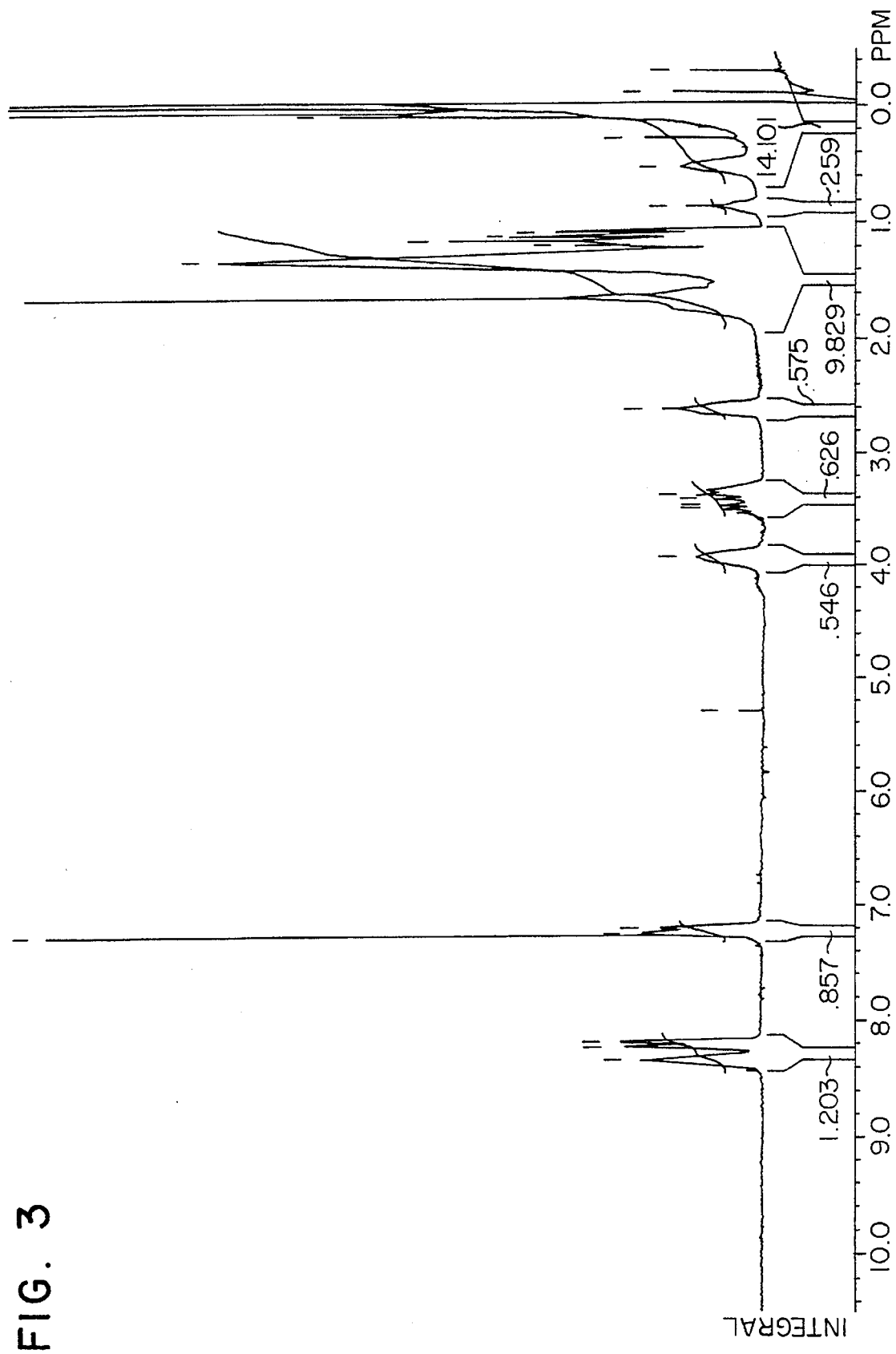

The $^1$H-NMR chart of the obtained polymer is shown in FIG. 3.

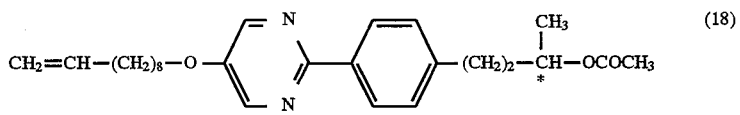

The phase sequences of the obtained polysiloxane was as follows:

g(−17° C.)Sx(26° C.)Sc*(71° C.)I

EXAMPLE 42

The vinyl monomer (17) of the following chemical structure:

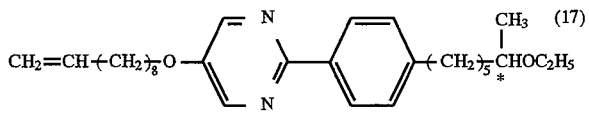

(467 mg), the vinyl monomer (18) of the following structure:

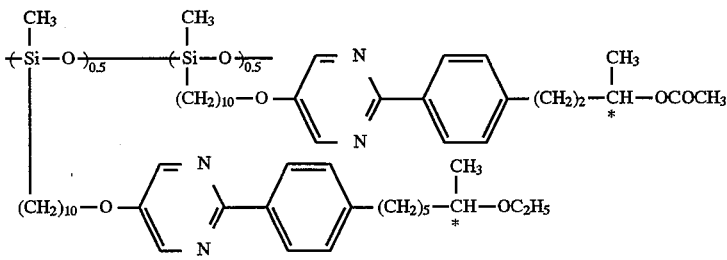

(437 mg) and polymethylhydrosiloxane having a number average molecular weight of $6.8 \times 10^2$ (124 mg) were dissolved in toluene (20 ml). After stirring the solution under the nitrogen atmosphere at room temperature for about 50 minutes, as a catalyst, a 0.6% solution of chloroplatinic acid hexahydrate in a mixture of isopropanol and toluene (0.5 ml) was added to the solution, and the reaction was effected under the nitrogen atmosphere-at about 75° C. for 7 hours. After the completion of the reaction, the reaction mixture was washed with water and the solvent was removed under reduced pressure. Purification was performed on GPC to obtain the polysiloxane having the following chemical structure. Number average molecular weight: $9.9 \times 10^3$.

The phase sequences of the obtained polysiloxane was as follows:

Sx(16° C.)Sc*(71° C.)I

EXAMPLE 43

The same vinyl monomer (16) as used in Example 40 (285 mg) and polymethylhydrosiloxane (43 mg) (manufactured by Aldrich) were dissolved in toluene (6 ml). After stirring the solution under the nitrogen atmosphere at room temperature for about 40 minutes, as a catalyst, a 0.6% solution of chloroplatinic acid hexahydrate in isopropanol (0.1 ml) was added to the solution, and the reaction was effected in the nitrogen stream at about 75° C. for 13 hours. During the reaction, the same catalyst solution (0.1 ml) was added. After the completion of the reaction, the reaction mixture was added in isopropanol to precipitate it and sedimented by a centrifugal separator, followed by removal of the supernatant by decantation. The obtained residue was dried under reduced pressure to obtain the polysiloxane having the following chemical structure (about 210 mg). Number average molecular weight: $1.5 \times 10^4$.

Figure 4:
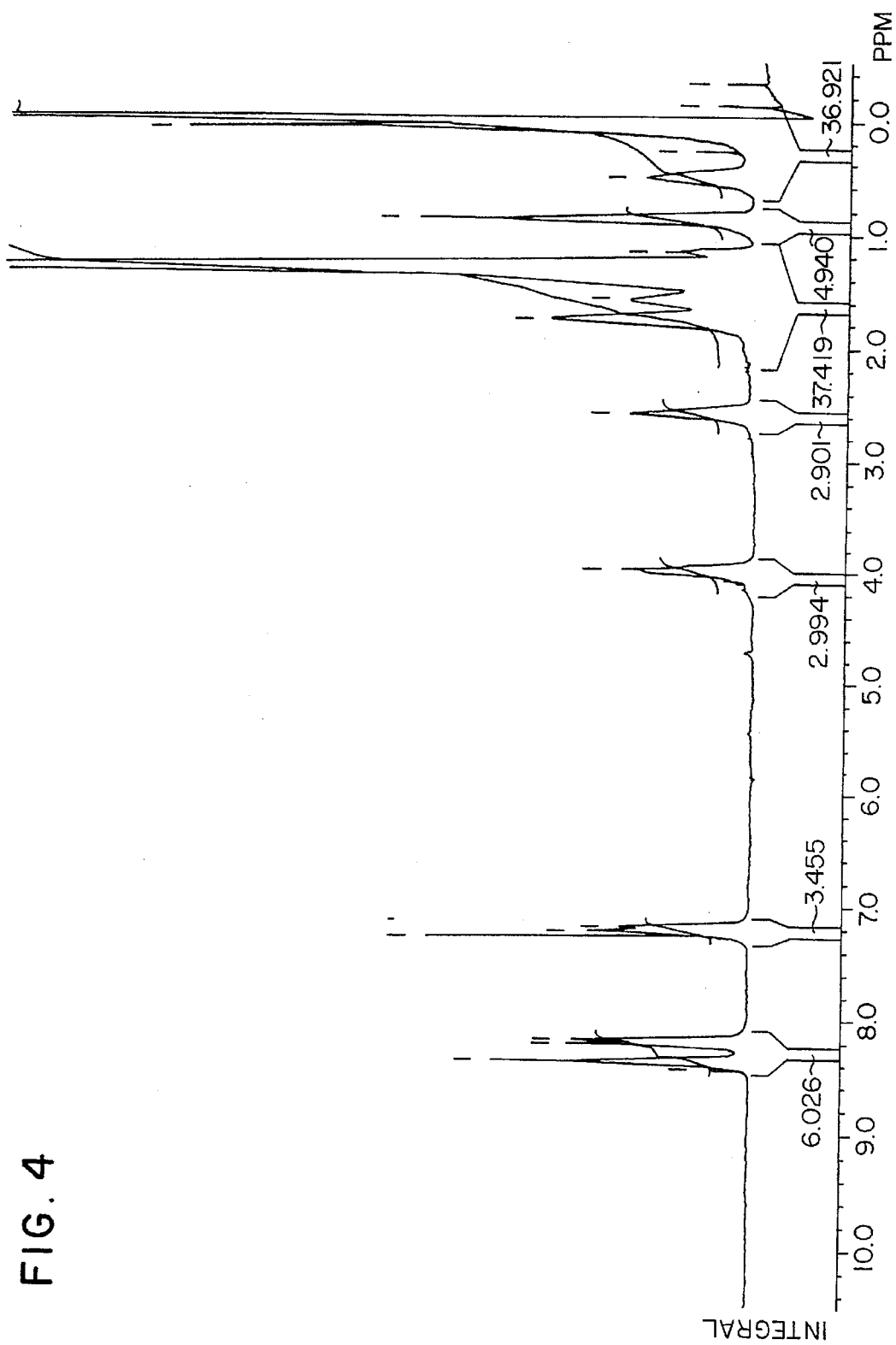

The $^1$H-NMR chart of the obtained polymer is shown in FIG. 4.

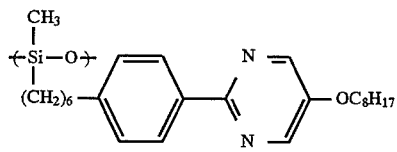

The phase sequences of the obtained polysiloxane was as follows:

S(159° C.)I

EXAMPLE 44

The same vinyl monomer (15) as used in Example 39 (177 mg) and 1,3,5,7,9-pentamethylcyclopentasiloxane (24 mg) (LS-8990 (trade name) manufactured by Shin-etsu Silicone Co., Ltd.) were dissolved in toluene (5 ml). After stirring the solution under the nitrogen atmosphere at room temperature for about 240 minutes, as a catalyst, a 0.3% solution of chloroplatinic acid hexahydrate in isopropanol (0.1 ml) was added to the solution, and the reaction was effected under the nitrogen atmosphere at about 75° C. for 7 hours. After the completion of the reaction, the reaction mixture was added in isopropanol to precipitate it and sedimentated by a centrifugal separator, followed by removal of the supernatant by decantation to obtain the polysiloxane having the following chemical structure. Number average molecular weight: $3.2 \times 10^3$.

Figure 5:
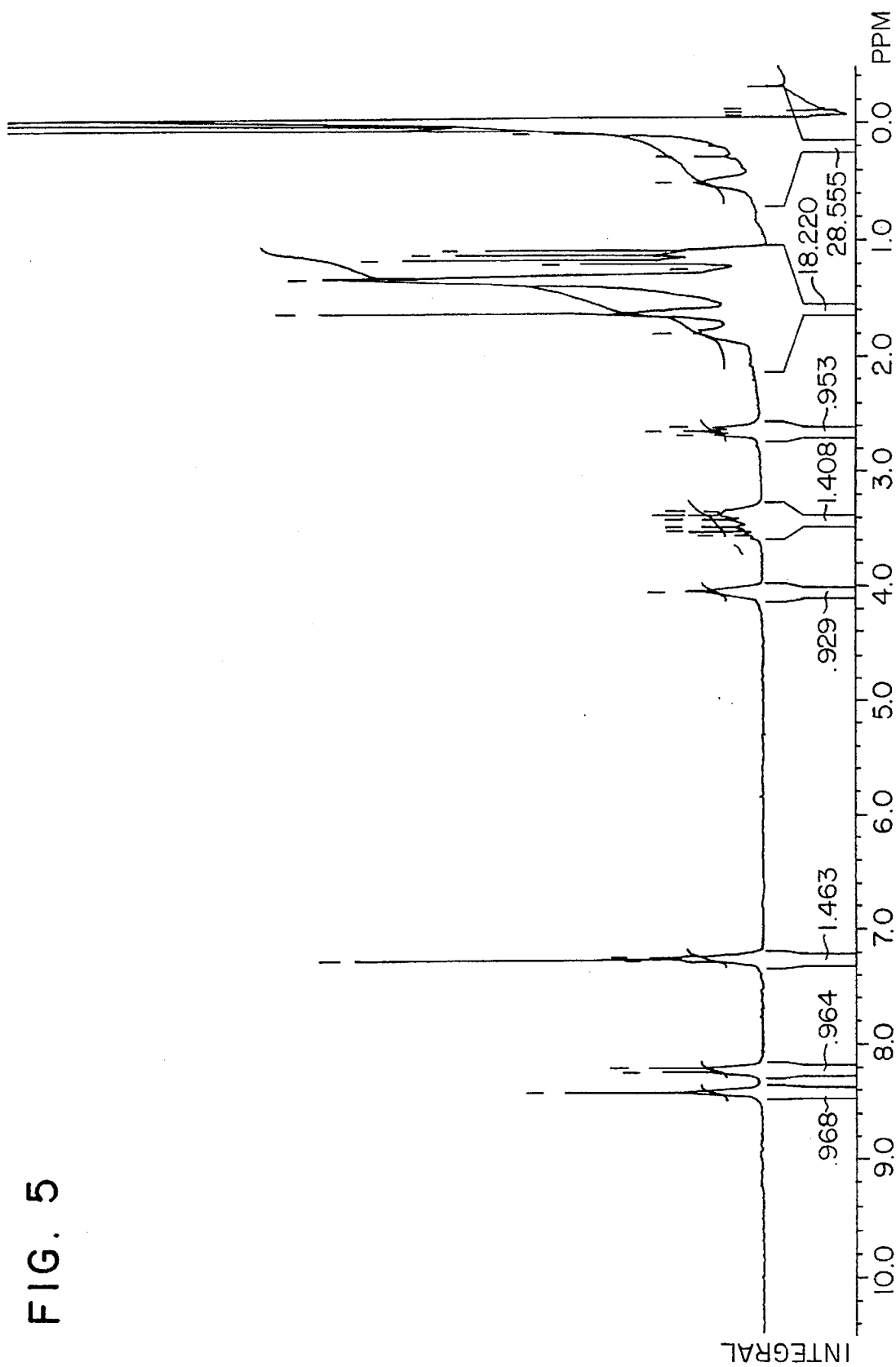

The $^1$H-NMR chart of the obtained polymer is shown in FIG. 5.

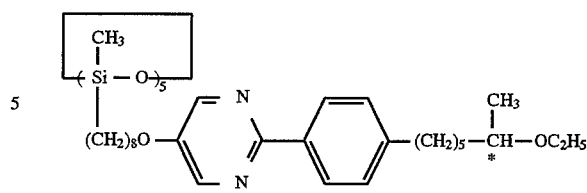

The phase sequences of the obtained polysiloxane was as follows:

Sx(−8° C.)Sc*(39° C.)I

EXAMPLE 45

The same vinyl monomer (17) as used in Example 42 (95 mg) and polymethylhydrosiloxane (12 mg) (manufactured by Aldrich) were dissolved in toluene (2 ml). After stirring the solution under the nitrogen atmosphere at room temperature for about 45 minutes, as a catalyst, a 0.4% solution of chloroplatinic acid hexahydrate in isopropanol (0.11 ml) was added to the solution, and the reaction was effected under the nitrogen atmosphere at about 75° C. for 10.5 hours. After the completion of the reaction, the reaction mixture was added in isopropanol to precipitate it and sedimentated by a centrifugal separator, followed by removal of the supernatant by decantation to obtain the polysiloxane having the following chemical structure. Number average molecular weight: $1.5 \times 10^4$.

Figure 6:
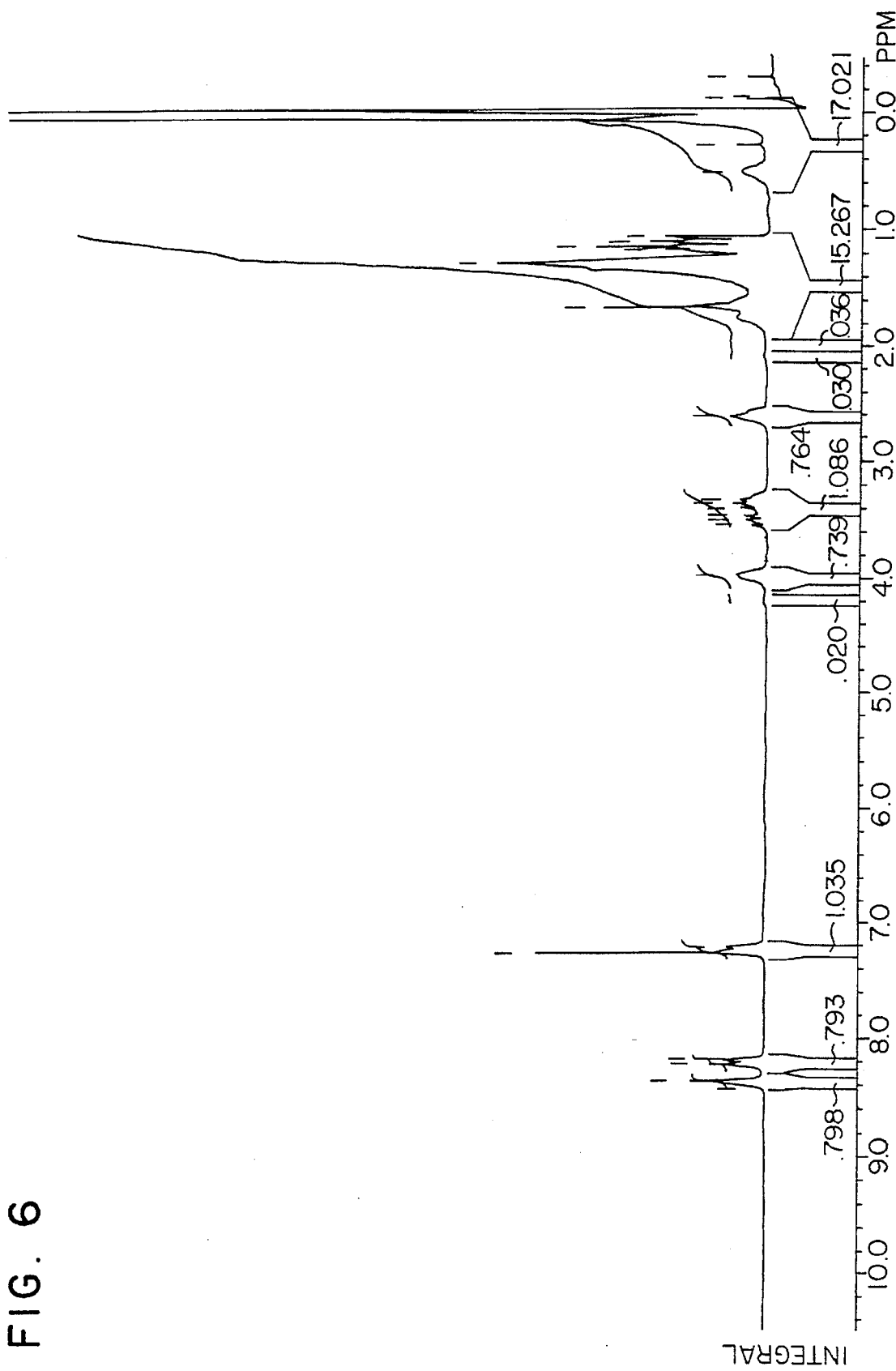

The $^1$H-NMR chart of the obtained polymer is shown in FIG. 6.

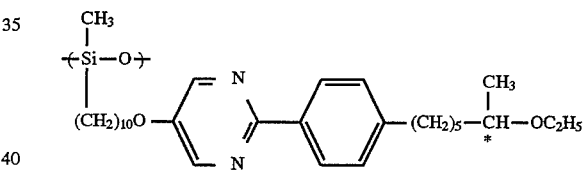

The phase sequences of the obtained polysiloxane was as follows:

Sx(34° C.)Sc*(77° C.)I

EXAMPLE 46

The same vinyl monomer (15) as used in Example 39 (45 mg), the same vinyl monomer (16) as used in Example 40 (117 mg) and polymethylhydrosiloxane (24 mg) (KF-99 (trade name) manufactured by Shin-etsu Silicone Co., Ltd.) were dissolved in toluene (5 ml). After stirring the solution under the nitrogen atmosphere at room temperature for about 80 minutes, as a catalyst, a 1.0% solution of chloroplatinic acid hexahydrate in isopropanol (0.04 ml) was added to the solution, and the reaction was effected under the nitrogen atmosphere at about 75° C. for 9 hours. After the completion of the reaction, the reaction mixture was adde in isopropanol to precipitate it and sedimented by a centrifugal separator, followed by removal of the supernatant by decantation to obtain the polysiloxane having the following chemical structure. Number average molecular weight: $9.4 \times 10^3$.

Figure 7:
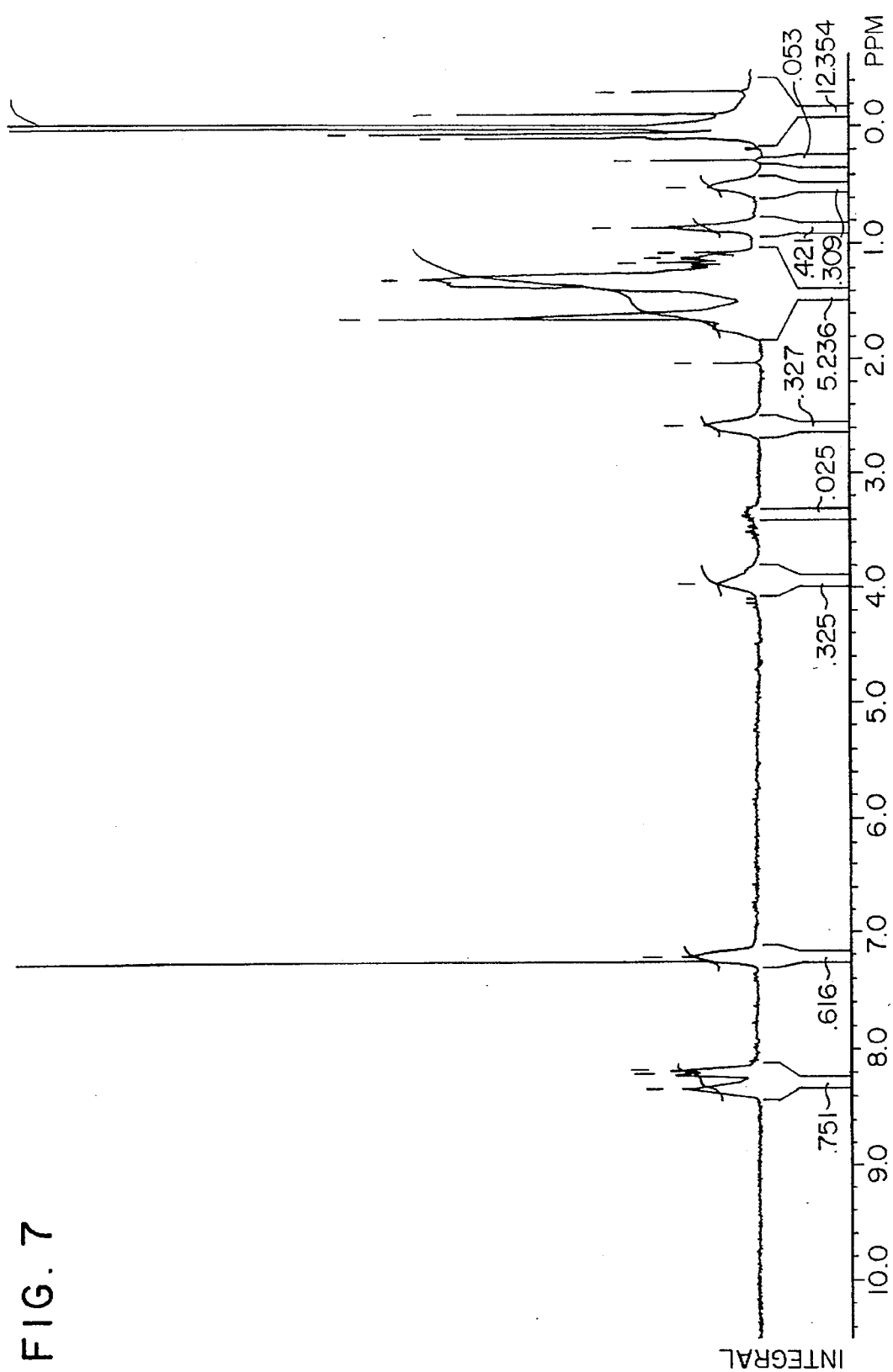

The $^1$H-NMR chart of the obtained polymer is shown in FIG. 7.

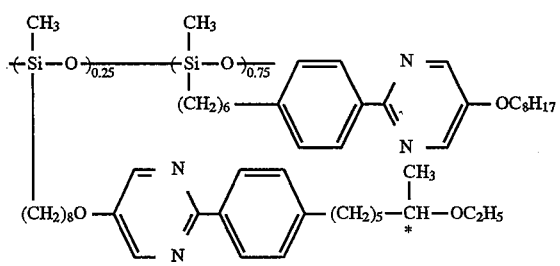

The phase sequences of the obtained polysiloxane was as follows:

Sx(71° C.)Sc*(74° C.)SA( 134° C.)I

EXAMPLE 47

The same vinyl monomer (16) as used in Example 40 (452 mg) and polymethylhydrosiloxane (70 mg) (KF-99 (trade name) manufactured by Shin-etsu Silicone Co., Ltd.) were dissolved in toluene (10 ml). After stirring the solution under the nitrogen atmosphere at room temperature for about 35 minutes, as a catalyst, a 1.0% solution of chloroplatinic acid hexahydrate in isopropanol (0.12 ml) was added to the solution, and the reaction was effected under the nitrogen atmosphere at about 75° C. for 9 hours. After the completion of the reaction, the reaction mixture was washed with water and the solvent was removed. The resulting residue was purified on GPC to obtain the polysiloxane having the following chemical structure. Number average molecular weight: $1.0 \times 10^4$.

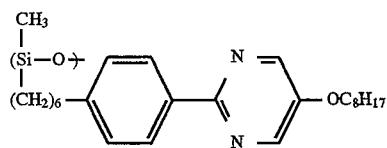

The phase sequences of the obtained polysiloxane was as follows:

S(163° C.)I

EXAMPLE 48

The same vinyl monomer (15) as used in Example 39 (99 mg) and polymethylhydrosiloxane (.14 mg) (KF-99 (trade name) manufactured by Shin-etsu Silicone Co., Ltd.) were dissolved in toluene (3 ml). After stirring the solution under the nitrogen atmosphere at room temperature for about 40 minutes, as a catalyst, a 1.0% solution of chloroplatinic acid hexahydrate in isopropanol (0.15 ml) was added to the solution, and the reaction was effected in the nitrogen stream at about 75° C. for 9 hours. After the completion of the reaction, the reaction mixture was washed with water and the solvent was removed. Purification was performed on GPC to obtain the polysiloxane having the following chemical structure. Number average molecular weight: $1.0 \times 10^4$.

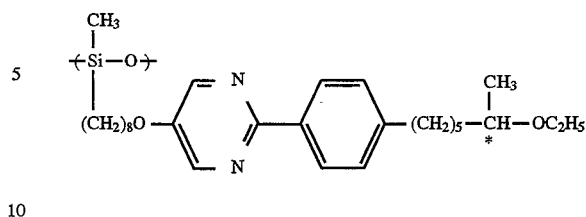

The phase sequences of the obtained polysiloxane was as follows:

Sx(12° C.)Sc*(47° C.)I

EXAMPLE 49

The same vinyl monomer (15) as used in Example 39 (94 mg), the same vinyl monomer (16) as used in Example 40 (81 mg) and polymethylhydrosiloxane (26 mg) (KF-99 (trade name) manufactured by Shin-etsu Silicone Co., Ltd.) were dissolved in toluene (5 ml). After stirring the solution under the nitrogen atmosphere at room temperature for about 35 minutes, as a catalyst, a 0.5% solution of chloroplatinic acid hexahydrate in isopropanol (0.1 ml) was added to the solution, and the reaction was effected under the nitrogen atmosphere at about 75° C. for 13 hours. After the completion of the reaction, the reaction mixture was washed with water and the solvent was removed. The resulting residue was purified on GPC to obtain the polysiloxane having the following chemical structure. Number average molecular weight: $1.0 \times 10^4$.

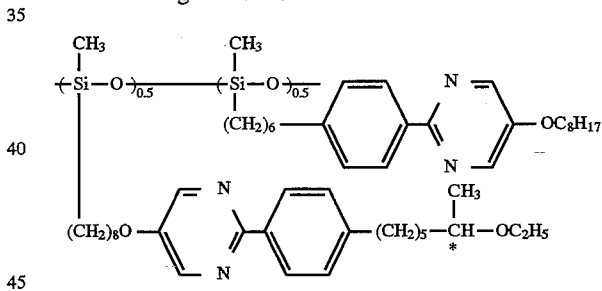

The phase sequences of the obtained polysiloxane was as follows:

Sx(47° C.)Sc*(70° C.)SA(113° C.)I

EXAMPLE 50

The acrylate monomer (19) of the structure:

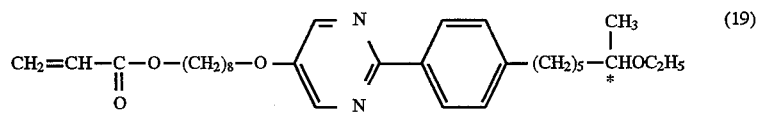

(107 mg) and AIBN (11 mg) (manufactured by Wako Junyaku Co., Ltd.) were dissolved in tetrahydrofuran (5 ml), and the mixture was stirred under the nitrogen atmosphere at 60° C. for about 8 hours. After cooling, the reaction mixture was poured in methanol and kept standing overnight. Then, the supernatant was removed by decantation, and the residue was collected to obtain the polyacrylate having the following chemical structure. Its number average molecular weight was $4.5 \times 10^3$.

The $^1$H-NMR chart of the obtained polymer is shown in FIG. 8.

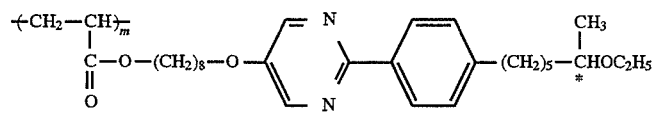

The phase sequences of the obtained polyacrylate was as follows:

Sx(16° C.)Sc*(46° C.)I

Response time: 31 ms.

EXAMPLE 51

The same acrylate monomer (19) as used in Example 50 (107 mg) and AIBN (11 mg) (manufactured by Wako Junyaku Co., Ltd.) were dissolved in tetrahydrofuran (5 ml), and the mixture was stirred under the nitrogen atmosphere at 60° C. for about 8 hours. After cooling, the reaction mixture was poured in methanol and kept standing overnight. From the supernatant, the solvent was distilled off under reduced pressure. The residue was dissolved in tetrahydrofuran and poured in methanol to reprecipitate the product. Then the precipitated product was collected to obtain the polyacrylate having the following chemical structure (15 mg). Its number average molecular weight was $3.2 \times 10^3$.

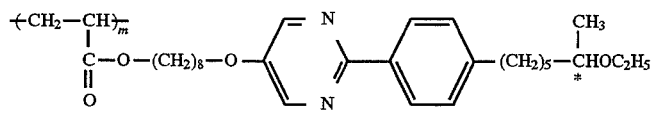

The phase sequences of the obtained polyacrylate was as follows:

Sx(36.5° C.)Sc*(44° C.)I

Response time: 12.5 ms.

EXAMPLE 52

The same acrylate monomer (19) as used in Example 50 (260 mg) and AIBN (27 mg) (manufactured by Wako Junyaku Co., Ltd.) were dissolved in tetrahydrofuran (15 ml), and the mixture was stirred under the nitrogen atmosphere at 60° C. for about 8 hours. After cooling, the reaction mixture was poured in methanol and kept standing overnight. Then, the supernatant was removed by decantation, and the precipitate was collected to obtain the polyacrylate having the following chemical structure (85 mg). Its number average molecular weight was $3.8 \times 10^3$.

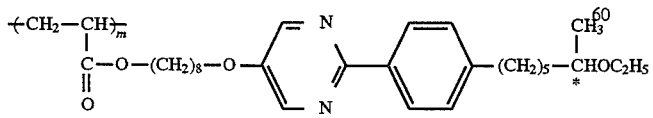

The phase sequences of the obtained polyacrylate was as follows:

Sx(42° C.)Sc*(42° C.)I

Response time: 15 ms. (44° C.)

The above polyacrylate had the relatively high response speed as the polymeric material.

EXAMPLE 53

Fifty percents by weight of the liquid crystalline polymer (20) of the formula:

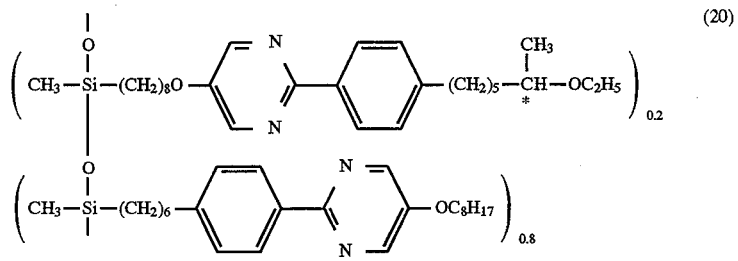

(Mn=1.8×10⁴)

and 50% by weight of the liquid crystal (21) of the formula;

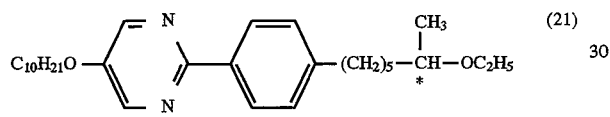

were mixed in an isotropic phase. The resulting mixture had the following phase sequences and contrast ratio:

Phase sequences:

Sc --<0--- Sc* --64--- SA --109--- I

Contrast ratio: 6 (20° C.).

EXAMPLE 54

Forty percents by weight of the same liquid crystalline polymer (20) as used in Example 53 and 60% by weight of the same liquid crystal (21) as used in Example 53 were mixed in the isotropic phase. The resulting mixture had the following phase sequences and contrast ratio:

Phase sequences:

Sc --−9--- Sc* --63--- SA --106--- I

Contrast ratio: 12 (20° C.).

EXAMPLE 55

Twenty five percents by weight of the liquid crystalline polymer (22) of the formula:

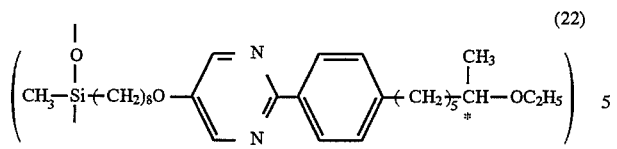

(Mn=2.3×10⁴)

and 75% by weight of the same liquid crystal (21) as used in Example 53 were mixed in the isotropic phase. The resulting mixture had the following phase sequences and contrast ratio:

Phase sequences:

$$Sx \xrightarrow{11} Sc^* \xrightarrow{51} I$$

Contrast ratio: 4 (20° C.).

EXAMPLE 56

Forty percents by weight of the same liquid crystalline polymer (20) as used in Example 53 and 60% by weight of the liquid crystal (23) of the formula:

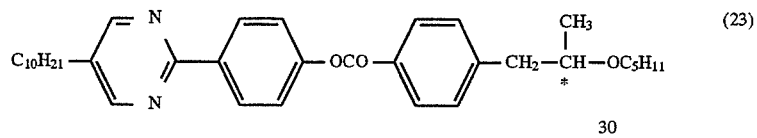

were mixed in the isotropic phase. The resulting mixture was encapsulated in a cell having a cell thickness of 2 μm coated with polyvinyl alcohol as an orientation film which had been subjected to the rubbing treatment. The contrast ratio was 22 (20° C.).

EXAMPLE 57

Thirty percents by weight of the liquid crystalline polymer (24) of the formula:

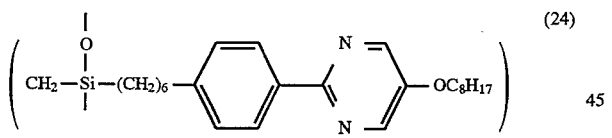

(Mn=1.5×10⁴):

and 70% by weight the same liquid crystal (23) as used in Example 56 were mixed in the isotropic phase. The resulting mixture was encapsulated in a cell having a cell thickness of 2 μm coated with polyvinyl alcohol as an orientation film which had been subjected to the rubbing treatment. The contrast ratio was 7 (30° C.).

EXAMPLE 58

Thirty percents by weight of the same liquid crystalline polymer (24) as used in Example 57 and 70% by weight of the liquid crystal (25) of the formula:

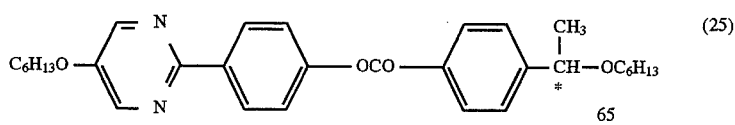

were mixed in the isotropic phase. The resulting mixture was encapsulated in a cell having a cell thickness of 2 μm coated with polyvinyl alcohol as an orientation film which had been subjected to the rubbing treatment. The contrast ratio was 11 (35° C.).

Comparative Example 1

The liquid crystalline polymer (20) which was used in Examples 53, 54 and 55 had the following phase sequences and contrast ratio:

Phase sequences:

$$Sx \xrightarrow{69} Sc^* \xrightarrow{74} SA \xrightarrow{135} I$$

Contrast ratio: 2 (70° C.).

This liquid crystalline polymer was not orientated on the orientation film used in Example 56.

Comparative Example 2

The liquid crystalline polymer (22) which was used in Example 55 had the following phase sequences and contrast ratio:

Phase sequences:

$$Sx \xrightarrow{-16} Sc^* \xrightarrow{48} I$$

Contrast ratio: 1 (20° C.).

Comparative Example 3

The liquid crystalline polymer (24) which was used in Examples 57 and 58 had the following phase sequences and contrast ratio:

Phase sequences:

$$S \xrightarrow{159} I$$

Contrast ratio: 2 (70° C.).

This liquid crystalline polymer had no ferroelectric property and was not orientated on the orientation film used in Example 56.

As seen from the results in Examples 53 to 58, the liquid crystal mixtures according to the present invention were excellent in orientation in comparison with the sole use of each liquid crystalline polymer, and had the improved contrast ratio.

EXAMPLE 59

The polyacrylate ferroelectric liquid crystalline polymer (26) of the following chemical formula having the number average molecular weight of 4000:

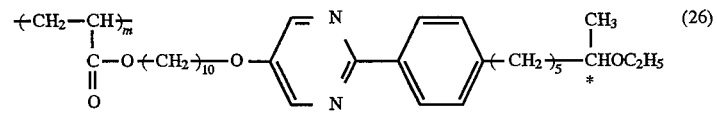

and the same liquid crystal (21) as used in Example 53 were mixed in the isotropic phase in the following weight ratio. The mixture had the following phase sequences and memory ratio.

(a) (26):(21)=50:50

Phase sequences:

$$Sx \underset{-10}{\overset{-10}{\rightleftarrows}} Sc^* \underset{50}{\overset{55}{\rightleftarrows}} I$$

Memory ratio: 49% (25° C.)

(b) (26):(21)=20:80

Phase sequences:

$$Sx \underset{-20}{\overset{-15}{\rightleftarrows}} Sc^* \underset{53}{\overset{53}{\rightleftarrows}} I$$

Memory ratio: 61% (25° C.)

Comparative Example 4

Each of the ferroelectric liquid crystalline polymer (59) and the ferroelectric liquid crystal (21) used in Example 59 had following phase sequences and memory ratio:

Liquid crystalline polymer (59):

Phase sequences:

$$Sx \underset{-3}{\overset{-3}{\rightleftarrows}} Sc^* \underset{50}{\overset{54}{\rightleftarrows}} I$$

Memory ratio: 0% (25° C.).

Liquid crystal (21):

Phase sequences:

$$Sx \underset{-2}{\overset{12}{\rightleftarrows}} Sc^* \underset{54}{\overset{55}{\rightleftarrows}} I$$

Memory ratio: 10% (25° C.).

TABLE 1

| Ex. No. | Hydroxy compound of the formula (2) | | | | | Alkylating agent of the formula (3) | | | | | |
|---|---|---|---|---|---|---|---|---|---|---|---|
| | −A−B− | X | n | s | $R^1$ | $X^1$ | $X^2$ | $X^3$ | p | q | Y |
| 7 | 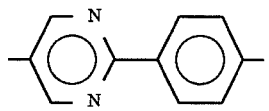 | −C≡C− | 3 | 0 | $C_2H_5$ | H | H | H | 0 | 8 | Br |
| 8 | 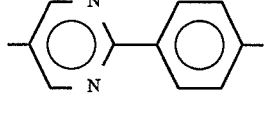 | −C≡C− | 3 | 0 | $C_4H_9$ | H | H | H | 0 | 6 | Br |
| 9 | 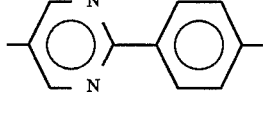 | −C≡C− | 1 | 0 | $C_2H_5$ | H | H | H | 0 | 8 | Br |
| 10 | 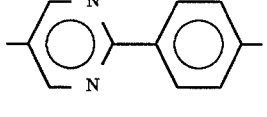 | −C≡C− | 0 | 0 | −(CH$_2$)$_2$C≡CCH$_3$ | H | H | H | 0 | 4 | Br |
| 11 | 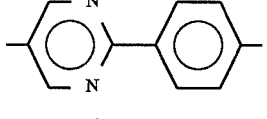 | −CH$_2$CH$_2$− | 1 | 1 | 2,2-dimethylcyclopropyl | H | H | H | 0 | 8 | Br |
| 12 | 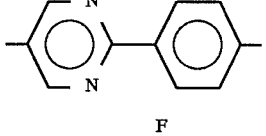 | −CH$_2$CH$_2$− | 2 | 0 | $CH_3$ | H | H | H | 0 | 8 | Br |
| 13 | 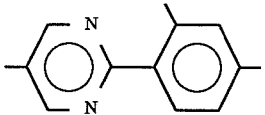 | −CH$_2$CH$_2$− | 3 | 0 | $C_2H_5$ | H | H | H | 0 | 8 | Br |
| 14 | 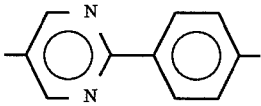 | −C≡C− | 1 | 0 | 2-methylbutyl | H | H | H | 0 | 8 | Br |

| Ex. No. | Compound of the formula (1) | | | | | | | | | $[a]_D$ C=1 CHCl$_3$ | I: Liquid, K: Crystal Sc, Ch: Liquid crystal phase Property |
|---|---|---|---|---|---|---|---|---|---|---|---|
| | $X^1$ | $X^2$ | $X^3$ | p | q | −A−B− | X | n | s | $R^1$ | | |
| 7 | H | H | H | 0 | 8 | 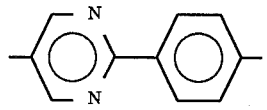 | −C≡C− | 3 | 0 | $C_2H_5$ | −2.9° | $K^{40}$−$Sc^{58}$−I |
| 8 | H | H | H | 0 | 6 | 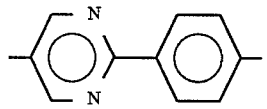 | −C≡C− | 3 | 0 | $C_4H_9$ | −2.8° | |
| 9 | H | H | H | 0 | 8 | 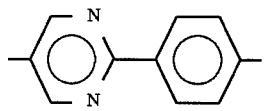 | −C≡C− | 1 | 0 | $C_2H_5$ | | |

TABLE 1-continued

| Ex. No. | −A−B− | | | | | X | n | s | R¹ | X¹ | X² | X³ | p | q | Y |
|---|---|---|---|---|---|---|---|---|---|---|---|---|---|---|---|
| 10 | H | H | H | 0 | 4 | pyrimidine–phenyl | −C≡C− | 0 | 0 | −(CH₂)₂C≡CCH₃ | | | | | | |
| 11 | H | H | H | 0 | 8 | pyrimidine–phenyl | −CH₂CH₂− | 1 | 1 | 2,2-dimethyl-cyclopropyl | | | | | −12° | |
| 12 | H | H | H | 0 | 8 | pyrimidine–phenyl | −CH₂CH₂− | 2 | 0 | CH₃ | | | | | | |
| 13 | H | H | H | 0 | 8 | pyrimidine–(2-F-phenyl) | −CH₂CH₂− | 3 | 0 | C₂H₅ | | | | | | |
| 14 | H | H | H | 0 | 8 | pyrimidine–phenyl | −C≡C− | 1 | 0 | 2-methylbutyl | | | | | | |

TABLE 2

| Ex. No. | −A−B− | X | n | s | R¹ | X¹ | X² | X³ | p | q | Y |
|---|---|---|---|---|---|---|---|---|---|---|---|
| 15 | pyrimidine–phenyl | −C≡C− | 1 | 1 | methoxymethyl | H | H | H | 0 | 8 | Br |
| 16 | pyrimidine–phenyl | −C≡C− | 3 | 1 | 1-methylpropyl | H | H | H | 1 | 8 | OTs |
| 17 | pyrimidine–phenyl | −C≡C− | 0 | 0 | C₆H₁₃ | H | H | H | 0 | 8 | Br |
| 18 | pyrimidine–phenyl | −C≡C− | 3 | 0 | C₃H₇ | H | H | CH₃ | 1 | 8 | OTs |
| 19 | phenyl–pyrimidine–phenyl | −C≡C− | 2 | 1 | C₃H₇ | H | H | CH₃ | 1 | 6 | OTs |
| 20 | phenyl–phenyl–phenyl | −C≡C− | 3 | 1 | CH₃ | H | H | H | 0 | 8 | Br |

TABLE 2-continued
| | | | | | | | | | | | | |
|---|---|---|---|---|---|---|---|---|---|---|---|---|
| 21 | 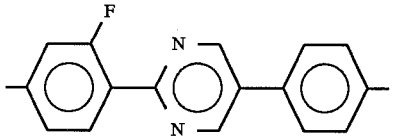 | | | −C≡C− | 3 | 0 | $C_2H_5$ | H | H | H | 0 | 6 | Br |
| 22 | 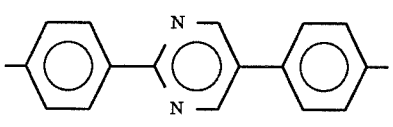 | | | −C≡C− | 3 | 0 | $C_2H_5$ | H | H | H | 0 | 8 | Br |
| | | | | | | | | | | I: Liquid, K: Crystal Sc, Ch: Liquid crystal phase |
|---|---|---|---|---|---|---|---|---|---|---|---|
| Ex. No. | | Compound of the formula (1) | | | | | | | | $C = 1$ $[\alpha]_D$ CHCl$_3$ | Property |
| | $X^1$ $X^2$ $X^3$ | p | q | −A−B− | X | n | s | $R^1$ | | | |
| 15 | H H H | 0 | 8 | 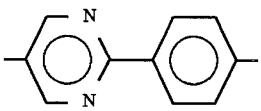 | −C≡C− | 1 | 1 | methoxymethyl | | | |
| 16 | H H H | 1 | 8 | 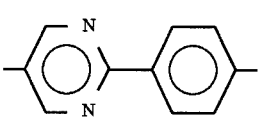 | −C≡C− | 3 | 1 | 1-methylpropyl | | +1.1° | |
| 17 | H H H | 0 | 8 | 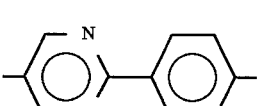 | −C≡C− | 0 | 0 | $C_6H_{13}$ | | | |
| 18 | H H CH$_3$ | 1 | 8 | 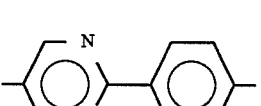 | −C≡C− | 3 | 0 | $C_3H_7$ | | | |
| 19 | H H CH$_3$ | 1 | 6 | 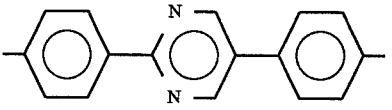 | −C≡C− | 2 | 1 | $C_3H_7$ | | +2.6° | |
| 20 | H H H | 0 | 8 | 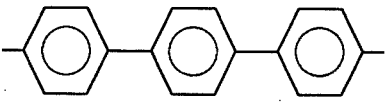 | −C≡C− | 3 | 1 | $CH_3$ | | +2.2° | |
| 21 | H H H | 0 | 6 | 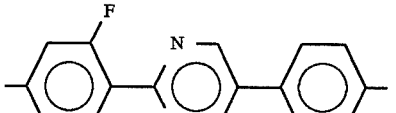 | −C≡C− | 3 | 0 | $C_2H_5$ | | | |
| 22 | H H H | 0 | 8 | 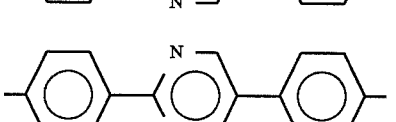 | −C≡C− | 3 | 0 | $C_2H_5$ | | | |

TABLE 3

| Ex. No. | Hydroxy compound of the formula (2) -A-B- | X | n | s | R¹ | Alkylating agent of the formula (3) X¹ | X² | X³ | p | q | Y |
|---|---|---|---|---|---|---|---|---|---|---|---|
| 23 | phenyl-pyrimidine | $-C\equiv C-$ | 3 | 0 | $C_2H_5$ | H | H | H | 0 | 8 | Br |
| 24 | phenyl-pyrimidine | $-C\equiv C-$ | 2 | 1 | $CH_3$ | H | H | H | 0 | 6 | OMs |
| 25 | pyrimidine-phenyl-phenyl | — | 0 | 0 | $C_6H_{13}$ | H | H | H | 1 | 8 | Br |
| 26 | pyrimidine-naphthyl | — | 0 | 0 | $C_6H_{13}$ | H | H | H | 1 | 8 | Br |
| 27 | pyrimidine-phenyl | — | 0 | 0 | $C_6H_{13}$ | H | H | H | 1 | 8 | Br |
| 28 | pyrimidine-phenyl | $-CH_2CH_2-$ | 1 | 0 | 2-methylbutyl | H | H | H | 0 | 8 | Br |
| 29 | pyrimidine-phenyl | " | 1 | 1 | methoxymethyl | H | H | H | 0 | 8 | Br |
| 30 | pyrimidine-phenyl | " | 3 | 1 | 1-methylpropyl | H | H | H | 1 | 8 | OTs |

I: Liquid, K: Crystal
Sc, Ch: Liquid crystal phase

C = 1
[a]_D

| Ex. No. | X¹ | X² | X³ | p | q | Compound of the formula (1) -A-B- | X | n | s | R¹ | CHCl₃ | Property |
|---|---|---|---|---|---|---|---|---|---|---|---|---|
| 23 | H | H | H | 0 | 8 | phenyl-pyrimidine | $-C\equiv C-$ | 3 | 0 | $C_2H_5$ | | melting point; 58° C. |
| 24 | H | H | H | 0 | 6 | phenyl-pyrimidine | $-C\equiv C-$ | 2 | 1 | $CH_3$ | +3.3° | |

TABLE 3-continued
| | | | | | | -A-B- | X | n | s | R¹ | |
|---|---|---|---|---|---|---|---|---|---|---|---|
| 25 | H | H | H | 1 | 8 | 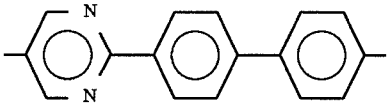 | — | 0 | 0 | C₆H₁₃ | |
| 26 | H | H | H | 1 | 8 | 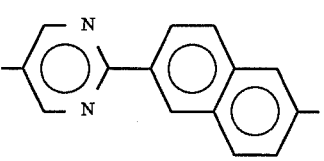 | — | 0 | 0 | C₆H₁₃ | |
| 27 | H | H | H | 1 | 8 | 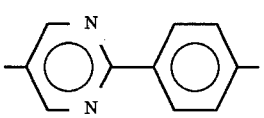 | — | 0 | 0 | C₆H₁₃ | |
| 28 | H | H | H | 0 | 8 | 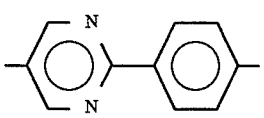 | —CH₂CH₂— | 1 | 0 | 2-methylbutyl | |
| 29 | H | H | H | 0 | 8 | 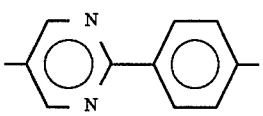 | " | 1 | 1 | methoxymethyl | |
| 30 | H | H | H | 1 | 8 | 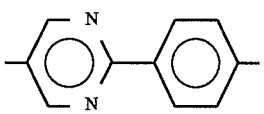 | " | 3 | 1 | 1-methylpropyl | +1.1° |
TABLE 4
| Ex. No. | Hydroxy compound of the formula (2) | | | | | Alkylating agent of the formula (3) | | | | | |
|---|---|---|---|---|---|---|---|---|---|---|---|
| | -A-B- | X | n | s | R¹ | X¹ | X² | X³ | p | q | Y |
| 31 | 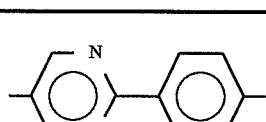 | —CH₂CH₃ | 0 | 0 | C₆H₁₃ | H | H | H | 0 | 8 | Br |
| 32 | 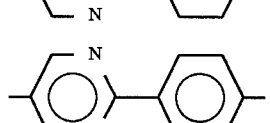 | " | 3 | 0 | C₃H₇ | H | H | CH₃ | 1 | 8 | OTs |
| 33 | 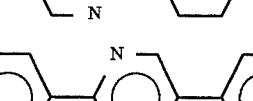 | " | 2 | 1 | C₃H₇ | H | H | CH₃ | 1 | 6 | OTs |
| 34 | 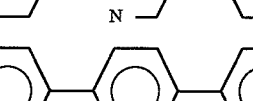 | " | 3 | 1 | CH₃ | H | H | H | 0 | 8 | Br |
| 35 | 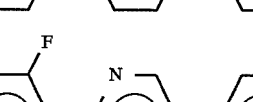 | " | 3 | 0 | C₂H₅ | H | H | H | 0 | 6 | Br |

TABLE 4-continued
| Ex. No. | -A-B- | X | n | s | R¹ | X¹ | X² | X³ | p | q | X |
|---|---|---|---|---|---|---|---|---|---|---|---|
| 36 | 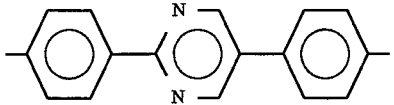 | " | 3 | 0 | C₂H₅ | H | H | H | 0 | 8 | Br |
| 37 | 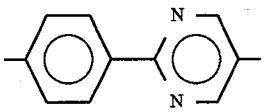 | " | 3 | 0 | C₂H₅ | H | H | H | 0 | 8 | Br |
| 38 | 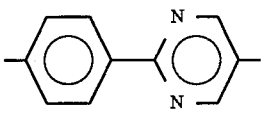 | " | 2 | 1 | CH₃ | H | H | H | 0 | 6 | OMs |
I: Liquid, K: Crystal
Sc, Ch: Liquid crystal phase
| Ex. No. | Compound of the formula (1) | | | | | | | | | C = 1 [α]$_D$ CHCl₃ | Property |
|---|---|---|---|---|---|---|---|---|---|---|---|
| | X¹ | X² | X³ | p | q | -A-B- | X | n | s | R¹ | | |
| 31 | H | H | H | 0 | 8 | 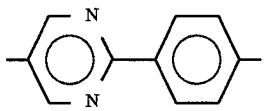 | -CH₂CH₂- | 0 | 0 | C₆H₁₃ | | |
| 32 | H | H | CH₃ | 1 | 8 | 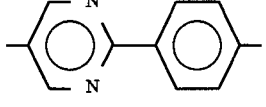 | " | 3 | 0 | C₃H₇ | | |
| 33 | H | H | CH₃ | 1 | 6 | 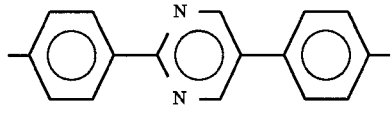 | " | 2 | 1 | C₃H₇ | +2.6° | |
| 34 | H | H | H | 0 | 8 | 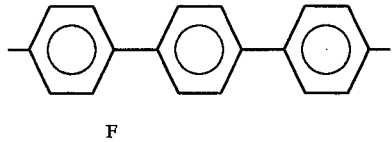 | " | 3 | 1 | CH₃ | +2.3° | |
| 35 | H | H | H | 0 | 6 | 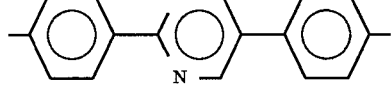 | " | 3 | 0 | C₂H₅ | | |
| 36 | H | H | H | 0 | 8 | 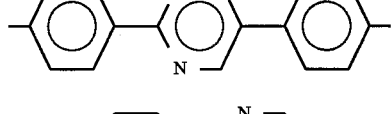 | " | 3 | 0 | C₂H₅ | | K¹⁵—Sc*¹³⁰—Ch¹³⁵—I |
| 37 | H | H | H | 0 | 8 | 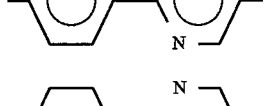 | " | 3 | 0 | C₂H₅ | | |
| 38 | H | H | H | 0 | 6 | 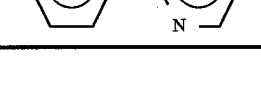 | " | 2 | 1 | CH₃ | +3.3° | |

What is claimed is:

1. A compound having an unsaturated side chain represented by the formula:

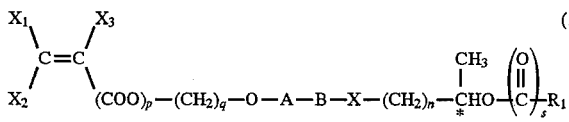 (1)

wherein A and B are the same or different and represent a group selected from the group consisting of 1,4-phenylene, 2,5-pyridine, 2,5-pyrimidine, 2,5-pyrazine, 3,6-pyridazine, 4,4'-biphenyl, 5-(2-phenylpyrimidine), 2-(5-phenylpyrimidine), 2-(5-phenylpyridine), 2,6-naphthalene, 2,6-quinoline, 2,6-quinoxaline and 2,6-quinazoline, or either one of A and B represents a single bond, and at least one of A and B represents 2,5-pyridine, 2,5-pyrimidine, 2,5-pyrazine, 3,6-pyridazine, 5-(2-phenylpyrimidine), 2-(5-phenylpyrimidine), 2-(5-phenylpyridine), 2,6-quinoline, 2,6-quinoxaline or 2,6-quinazoline, provided that the phenyl ring may be optionally substituted with at least one fluorine atom; $X_1$, $X_2$ and $X_3$ are the same or different and represent a hydrogen atom or a lower alkyl group having 1 to 5 carbon atoms; $R_1$ represents a saturated or unsaturated alkyl group having 1 to 20 carbon atoms which may be optionally substituted with at least one halogen atom or an alkoxyalkyl group having 2 to 20 carbon atoms which may be optionally substituted with at least one halogen atom; X represents —$CH_2CH_2$—, —CH=CH—, —C≡C— or a single bond; n is an integer of 0 to 6; q is an integer of 1 to 15; p is 1 and s is 0 or 1; and the asterisk * indicates an asymmetric carbon atom.

2. The compound according to claim 1, wherein $X_1$, $X_2$ and $X_3$ are hydrogen atoms.

3. A liquid crystalline polymer having a number average molecular weight of 1000 to 50,000 and comprising a repeating unit of the formula:

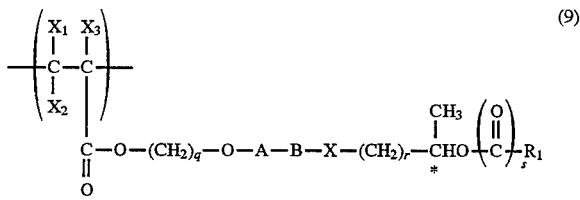 (9)

wherein A and B are the same or different and represent a group selected from the group consisting of 1,4-phenylene, 2,5-pyridine, 2,5-pyrimidine, 2,5-pyrazine, 3,6-pyridazine, 4,4'-biphenyl, 5-(2-phenylpyrimidine), 2-(5-phenylpyrimidine), 2-(5-phenylpyridine), 2,6-naphthalene, 2,6-quinoline, 2,6-quinoxaline and 2,6-quinazoline, or either one of A and B represents a single bond, and at least one of A and B represents 2,5-pyridine, 2,5-pyrimidine, 2,5-pyrazine, 3,6-pyridazine, 5-(2-phenylpyrimidine), 2-(5-phenylpyrimidine), 2-(5-phenylpyridine), 2,6-quinoline, 2,6-quinoxaline or 2,6-quinazoline, provided that the phenyl ring may be optionally substituted with at least one fluorine atom; $X_1$, $X_2$ and $X_3$ are the same or different and represent a hydrogen atom or a lower alkyl group having 1 to 5 carbon atoms; $R_1$ represents a saturated or unsaturated alkyl group having 1 to 20 carbon atoms which may be optionally substituted with at least one halogen atom or an alkoxyalkyl group having 2 to 20 carbon atoms which may be optionally substituted with at least one halogen atom; X represents —$CH_2CH_2$—, —CH=CH—, —C≡C— or a single bond; n is an integer of 0 to 6; q is an integer of 1 to 15; s is 0 or 1; and the asterisk * indicates an asymmetric carbon atom.

4. A polyacrylate liquid crystalline polymer having a number average molecular weight of 1000 to 50,000 and comprising a repeating unit of the formula:

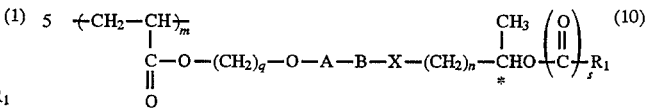 (10)

wherein A and B are the same or different and represent a group selected from the group consisting of 1,4-phenylene, 2,5-pyridine, 2,5-pyrimidine, 2,5-pyrazine, 3,6-pyridazine, 4,4'-biphenyl, 5-(2-phenylpyrimidine), 2-(5-phenylpyrimidine), 2-(5-phenylpyridine), 2,6-naphthalene, 2,6-quinoline, 2,6-quinoxaline and 2,6-quinazoline, or either one of A and B represents a single bond, and at least one of A and B represents 2,5-pyridine, 2,5-pyrimidine, 2,5-pyrazine, 3,6-pyridazine, 5-(2-phenylpyrimidine), 2-(5-phenylpyrimidine), 2-(5-phenylpyridine), 2,6-quinoline, 2,6-quinoxaline or 2,6-quinazoline, provided that the phenyl ring may be optionally substituted with at least one fluorine atom; $X_1$, $X_2$ and $X_3$ are the same or different and represent a hydrogen atom or a lower alkyl group having 1 to 5 carbon atoms; $R_1$ represents a saturated or unsaturated alkyl group having 1 to 20 carbon atoms which may be optionally substituted with at least one halogen atom or an alkoxyalkyl group having 2 to 20 carbon atoms which may be optionally substituted with at least one halogen atom; X represents —$CH_2CH_2$—, —CH=CH—, —C≡C— or a single bond; n is an integer of 0 to 6; q is an integer of 1 to 15; p is 1 and s is 0 or 1; and the asterisk * indicates an asymmetric carbon atom, and wherein m is 3 to 500, which is obtained by polymerizing a compound of the formula (1) as claimed in claim 1 wherein $X_1$, $X_2$ and $X_3$ are hydrogen atoms and p is one in the presence of a polymerization initiator.

5. A ferroelectric liquid crystal mixture comprising a liquid crystalline polymer as claimed in claim 3 and at least one other ferroelectric liquid crystal.

6. The ferroelectric liquid crystal mixture according to claim 5, wherein said other ferroelectric liquid crystal is a compound of the formula

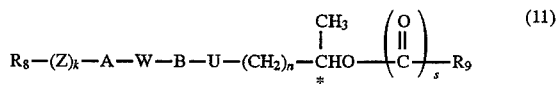 (11)

wherein A and B are the same or different and represent a group selected from the group consisting of 1,4-phenylene, 2,5-pyridine, 2,5-pyrimidine, 2,5-pyrazine, 3,6-pyridazine, 4,4'-biphenyl, 5-(2-phenylpyrimidine), 2-(5-phenylpyrimidine), 2-(5-phenylpyridine), 2,6-naphthalene, 2,6-quinoline, 2,6-quinoxaline and 2,6-quinazoline, or either one of A and B represents a single bond, provided that the phenyl ring may be optionally substituted with at least one fluorine atom; $R_8$ represents an alkyl group having 3 to 20 carbon atoms; $R_9$ represents a saturated or unsaturated alkyl group having 1 to 20 carbon atoms which may be optionally substituted with at least one halogen atom or a saturated or unsaturated alkoxyalkyl group having 2 to 20 carbon atoms which may be optionally substituted with at least one halogen atom; U represents a group of the formula: —O—, —$CH_2CH_2$—, —CH=CH— or —C≡C— or a single bond; W is a single bond; Z is a group of the formula: —O—, —COO— or —OCO—; n is an integer of 0 to 6; s and k are each zero or one; and the asterisk * indicates an asymmetric carbon atom.

7. A liquid crystal display element comprising the ferroelectric liquid crystal mixture as claimed in claim 5.

8. A liquid crystal display element comprising the ferroelectric liquid crystal mixture as claimed in claim 6.

9. A ferroelectric liquid crystal mixture comprising a liquid crystalline polymer as claimed in claim 4 and at least one other ferroelectric liquid crystal.

10. The ferroelectric liquid crystal mixture according to claim 9, wherein said other ferroelectric liquid crystal is a compound of the formula

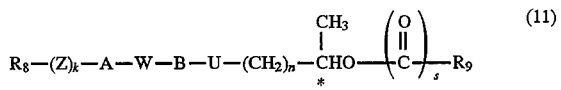
(11)

wherein A and B are the same or different and represent a group selected from the group consisting of 1,4-phenylene, 2,5-pyridine, 2,5-pyrimidine, 2,5-pyrazine, 3,6-pyridazine, 4,4'-biphenyl, 5-(2-phenylpyrimidine), 2-(5-phenylpyrimidine), 2-(5-phenylpyridine), 2,6-naphthalene, 2,6-quinoline, 2,6-quinoxaline and 2,6-quinazoline, or either one of A and B represents a single bond, provided that the phenyl ring may be optionally substituted with at least one fluorine atom; $R_8$ represents an alkyl group having 3 to 20 carbon atoms; $R_9$ represents a saturated or unsaturated alkyl group having 1 to 20 carbon atoms which may be optionally substituted with at least one halogen atom or a saturated or unsaturated alkoxyalkyl group having 2 to 20 carbon atoms which may be optionally substituted with at least one halogen atom; U represents a group of the formula: —O—, —$CH_2CH_2$—, —CH=CH— or —C≡C— or a single bond; W is a single bond; Z is a group of the formula: —O—, —COO— or —OCO—; n is an integer of 0 to 6; s and k are each zero or one; and the asterisk , indicates an asymmetric carbon atom.

11. A liquid crystal display element comprising the ferroelectric liquid crystal mixture as claimed in claim 9.

12. A liquid crystal display element comprising the ferroelectric liquid crystal mixture as claimed in claim 10.

* * * * *